(12) United States Patent
Coney

(10) Patent No.: US 11,844,741 B2
(45) Date of Patent: *Dec. 19, 2023

(54) TRAVEL ASSISTANCE SYSTEM

(71) Applicant: BRUCE CORPORATION, Beaumont, TX (US)

(72) Inventor: Lillie Bruce Coney, Beaumont, TX (US)

(73) Assignee: Bruce Corporation, Beaumont, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/510,244

(22) Filed: Oct. 25, 2021

(65) Prior Publication Data

US 2022/0249314 A1    Aug. 11, 2022

Related U.S. Application Data

(63) Continuation of application No. 16/314,553, filed on Dec. 31, 2018, now Pat. No. 11,331,242.

(51) Int. Cl.
| | |
|---|---|
| *A61H 3/00* | (2006.01) |
| *A61H 3/06* | (2006.01) |
| *G01C 21/20* | (2006.01) |
| *G06F 1/16* | (2006.01) |
| *G08G 1/005* | (2006.01) |
| *A61H 3/02* | (2006.01) |

(52) U.S. Cl.
CPC ............... *A61H 3/061* (2013.01); *A61H 3/02* (2013.01); *G01C 21/20* (2013.01); *G06F 1/163* (2013.01); *G08G 1/005* (2013.01); *A61H 2201/5058* (2013.01); *A61H 2201/5069* (2013.01); *A61H 2201/5079* (2013.01); *A61H 2201/5084* (2013.01)

(58) Field of Classification Search
None
See application file for complete search history.

(56) References Cited

U.S. PATENT DOCUMENTS

2016/0124588 A1 * 5/2016 Cotier ................ G06F 3/04815
715/708

* cited by examiner

*Primary Examiner* — Daniel T Tekle
(74) *Attorney, Agent, or Firm* — Nolte Lackenbach Siegel

(57) ABSTRACT

Apparatuses, systems and methods associated with a travel assistance system. A wearable personal navigation device may include a communication system, an indicator, and a processor coupled to the communication system and the indicator. The processor may be configured to generate a request for a navigation path from a location to a destination and transmit the request to a node of the network. The processor may be configured to determine the direction of travel from the location of the user based on a first navigation path received from the node of the network in response to the request, wherein the first navigation path includes at least one modification from a second navigation path, wherein the modification is based on data received by the network from a remote device that indicates an object, and cause the indicator to indicate the direction of travel. Other embodiments may be described and/or claimed.

20 Claims, 13 Drawing Sheets

TRAVEL ASSISTANCE SYSTEM

RELATED APPLICATIONS

This application is a continuation of co-pending U.S. patent application Ser. No. 16/314,553, filed Dec. 31, 2018, to which priority is claimed for all available purposes including the right of priority. This application is also related to, and claims priority to, U.S. Provisional Patent Application No. 62/359,028, filed on Jul. 6, 2016.

COPYRIGHT NOTICE

© 2017 Lillie Coney. A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to the field of travel assistance systems. More particularly, the present disclosure relates to a travel assistance system that supplements map data with data captured by wearable personal navigation devices and/or beacons, and provides directions in formats that do not rely solely upon visual aids or actions taken by the user, which may be for impaired users.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In legacy travel assistance systems, the systems may rely on network-accessible maps to determine a route from a starting point to the destination. The network-accessible maps are often generated and not updated based on changes to the physical locations. The use of maps for guidance purposes often relies upon generating digital representations or images from stored databases. Reliance upon visual representations for the purpose of navigation may offer distractions to a user. Further, the network-accessible maps fail to identify obstacles along the route, such as construction, bumps, and other obstacles. These legacy travel assistance systems do not reveal details in smaller units of measurements such as centimeters, feet, or inches. In addition, the lack of identification of the obstacles or path conditions could present risks to a user being guided along the route.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
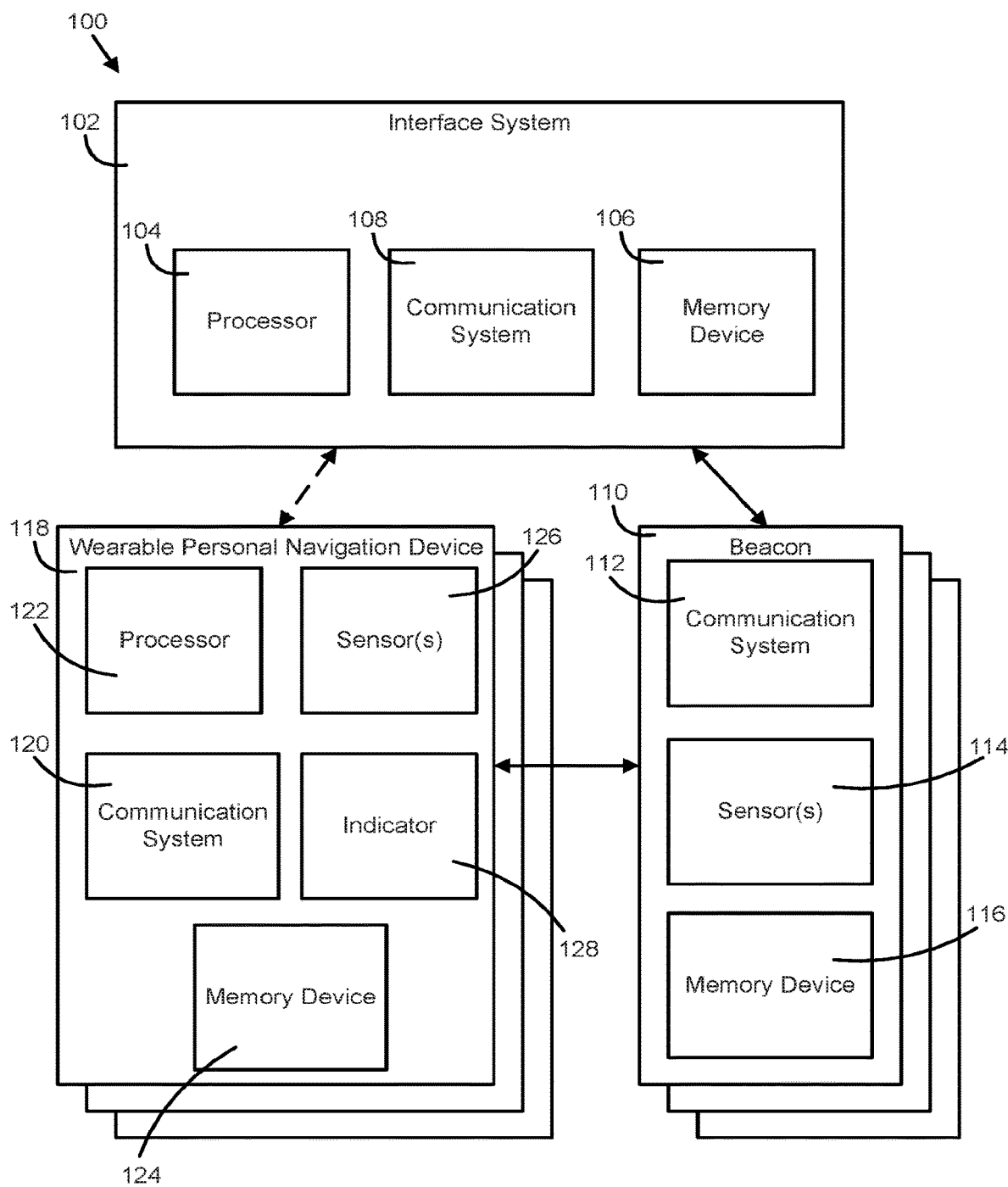
FIG. 1 illustrates an example travel assistance system, according to various embodiments.

Apparatuses, systems and methods associated with a travel assistance system. A wearable personal navigation device may use proximity in an arrangement of technologies or applications that include a communication system, an indicator, and a processor coupled to the communication system and the indicator, and/or a hybrid system comprising garments to be worn that incorporate one or more of the features described herein to form a travel assistance system that uses sensation to communicate to the user's sense of touch the application of sensation and/or audio that form shapes, pats, thrums, or other means that are discernable through touch sensation, and/or, to the user's sense of hearing, audio communication. The processor may be configured to generate a request for a navigation path from a location to a destination and transmit the request to a node of the network. The travel assistance system may query a user regarding instructions, if certain conditions are met, that indicate the user may be having difficulty navigating. Further, the travel assistance system may retain and retransmit, upon request or from a learned preference, a route or path which may be based upon the date, day, time of day, weather condition, crime reports, accident reports, or other factors which have associated stored travel routes. The processor may be configured to determine the user's preference for travel and the direction of travel from the location of the user based on a first navigation path received from the node of the network in response to the request, wherein the first navigation path includes at least one modification from a second navigation path, wherein the modification is based on data received by the network from a remote device that indicates an object, and cause the indicator to indicate the direction of travel.

The travel assistance system may be useful in situations where a user is unable to be guided to a destination by sight or may use mobility assistive services, devices and/or technology. Further, the travel assistance system may provide sensory directions to a user, which may present less of a distraction than legacy travel assistance systems that rely on visual displays of digital representations and/or images. For example, individuals with disabilities may wish to travel to a destination without the ability of sight or bipedal locomotion. Legacy travel assistance systems may lack information about the surroundings of the individuals and/or details of the navigation path that may be specific to the needs of individual forms locomotion from a location of the individual to the destination, which may pose danger or risks of injury to the individuals. The travel assistance system disclosed herein may provide additional information regarding the surroundings that may reduce danger or risk of injury to the individuals.

The travel assistance system may further be useful in emergency situations. Often in emergency situations, emergency crews must travel through dark or low visibility conditions, unfamiliar settings, and/or are unable to determine obstacles along a path to rescue a victim or reached safety. The travel assistance system disclosed herein may provide information that helps emergency crews navigate through the dark or low vision surroundings and/or determine obstacles that may not be determinable by legacy travel assistance systems.

The travel assistance system may be useful in healthcare settings such as hospitals, custodial care or home settings. The travel assistance system may provide prompts based on time of day, day of the week physical condition, environmental factors, or other indicators that indicate action should be taken. Medical errors account for thousands of deaths and injuries each year. Having the correct patient and the correct application of medical skill and knowledge for a patient's condition as well adherence to protocols regarding hygiene and standards of care may reduce the risks of errors. The user can navigate to the correct location and/or confirm that the medicines, therapeutic, or care is appropriate for the intended recipient. For example, the care provider can be prompted to attend to a patient that is scheduled to receive an antibiotic medication and ensure that right dosage is provided at the correct time. In addition, upon entering the patient's room the identity of the care provider may be logged and their proximity to the sanitizer dispenser may be registered, as well as whether it was used, and, if the sanitizer dispenser is not used, an alert may be sent to the healthcare professional to remind them to use the sanitizer dispenser before attending the patient.

The travel assistance system may be useful in supply chain management where in an end-to-end global system of inventory control is supported. For example, when a shipping clerk receives a request for an item they may place a query to the travel assistance system, which can locate that there is one item located on a truck being driven to store. The travel assistance system can provide the name of the driver, their company issued cellphone, their dispatchers name and contact information, information on the item such as whether it was a special order for a customer or not. Further, the system can support the shipping clerk communicating at any point in the supply chain to the individual with a link to the company that is the nearest in geo-location or proximity to the queried item and provide guidance on retrieval of the item and the procedure for it being transported to a desired location. This system can provide near real-time inventory data for registered items based on a database or data communicated by wireless tags or beacons.

The travel assistance system may be helpful in manufacturing, repair, and maintenance situations where accurate information or the correct part being installed and the use of proper fasteners, components, or approved parts to remediate breakdowns or conduct repairs and routine maintenance may be beneficial. For example, a commercial aircraft may travel outside of the United States and may need repair, but there is no mechanism for assuring that the part, prior to or during installation, meets factory specifications. Further, there may be no approach that assures that the correct location where a repair is needed or service is required. In some embodiments, the travel assistance system may allow a pilot, manufacturer or aviation authority to determine if changes occurred that introduced a part or item absent a service request as well as assure that services provided meet specification requirements.

The travel assistance system may be useful to motor vehicle, water navigation systems, and aerospace transport. The travel assistance system may support guidance that does not rely solely upon visual maps, navigation charts, or astronavigation. The travel assistance system may collect and report mapping guidance based upon immediate environment to supplement stored or retrieved mapping or map data. Further, the units of measurement may range from the largest units to smallest units to support navigation among lanes of a highway, for a fully automated air traffic control system, autonomous shipping and resupply systems, safety and security deterrence and compliance systems, mass transit systems, other services that have provisioning objectives that may be accomplished through or supported in part by automated systems or subsystems.

The travel assistance system may be helpful to municipal governments, and property owners in identifying hazards, risks, or impediments to egress and ingress so that they may be addressed or repaired. Further, municipal governments or property owners may provide content to the travel assistance system on the availability of public spaces (such as walkways, aisles, elevators, escalators, roads, parks, beaches, recreational areas, and/or paths) for travel and/or use. Users of public or commercial space may communicate to municipal government or a property owner conditions that warrant redress as the conditions may pose a risk of injury and/or inconvenience to users or customers.

The travel assistance system may be helpful to those who are distracted while walking or using a personal autonomous form of conveyance in pedestrian spaces. For example, a person texting, while walking may not be aware of changes in the surface of the walkway they are using, know when they are approaching steps, or escalators, how far they are away from a bus stop, or how to navigate to the entrance of a building.

The travel assistance system may allow users of the system to capture images and/or video (wherein it is to be understood that video may be a series of images) that may obscure people, but not their surroundings. The images and/or video may be bartered, sold, or licensed for use by legacy mapping or advanced navigation services from the user of the travel assistance system in exchange for in-kind services, coupons, or monetary compensation.

The travel assistance system may store data regarding hazards or risks and may communicate that information to property owners or municipal services. For example, a tree root has raised the sidewalk and the path poses a risk of pedestrian falls or injury. A notice may be sent to the owners of the property of municipal services to make a repair. Further the traveler assistance system can route users around the obstacle until it is repaired.

The travel assistance system may include an interface that may incorporate speech recognition and voice identification to secure the device from accepting commands or misinterpreting ambient or environmental noise as commands.

The travel assistance system may allow interfaces for assistive devices, technologies or applications such as gloves, sip and puff devices, or other devices or applications designed to assist persons with multiple disabilities or those working in environments or situations where vocal communication is kept at a minimum. In some embodiments, gloves, video feeds, and/or motion detection, may translate sign language into requests to the traveler assistance system. The traveler assistance system may provide information in visual form or translate it as non-audible guidance to wearable interfaces.

The travel assistance system may support interruption of travel and resumption of travel and amendment of travel destination at the discretion of the user.

The travel assistance system may allow a user to identify another user they are seeking to join or travel with at some point in their journey.

A user of the travel assistance system may have the option of not sharing or allowing others to determine if they are using the travel assistance system.

A user may use a digital address book or previous travel history to request that they have a link with another user of the travel assistance system.

A user may approve a request from another user to share traveler assistance system information.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

As used herein, the term 'user' may refer to a wearer, a bearer, or someone having another relationship to the travel assistance systems and/or the wearable personal navigation devices described throughout this disclosure.

As used herein, the term 'interface system' may refer to a server, an interface device, a device that is designed to process requests and deliver data to one or more components of the travel assistance system (such as beacons, geo-proximity plugs, and/or wearable personal navigation devices) or some combination thereof.

The travel assistance system may be a user centric system that may take into consideration medical knowledge (including current and/or historic medical knowledge), humans, and/or domesticated animals, then may incorporate the state of the art in security by design, data protection, usability, accessibility, failsafe by design, privacy by design, and the protection of natural persons to achieve optimal privacy, security, safety, resiliency, trustworthiness, confidentiality, integrity and availability.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 illustrates an example travel assistance system 100, according to various embodiments. The travel assistance system 100 may include an interface system 102. The interface system 102 may include a processor 104. The processor 104 may perform one or more of the operations described as being performed by the interface system 102 and/or the processor 104 described throughout this disclosure. While the processor 104 is referred to in the singular form, it is to be understood that the processor 104 may include one or more processors that perform the operations.

The interface system 102 may further include one or more memory devices 106. The memory devices 106 may include one or more random access memory (RAM) devices and/or read only memory (ROM) devices. The memory devices 106 may store one or more instructions that, when executed by the interface system 102, cause the interface system 102 to perform one or more of the operations described throughout this disclosure. The memory devices 106 may store information received by the interface system 102 and/or provided by the interface system 102, such as one or more navigation paths, ratings associated with the navigation paths, one or more representation of images, one or more indications of objects, user feedback, or some combination thereof, as described further throughout this disclosure. In some embodiments, the information, or portions thereof, may be associated with a certain user and/or wearable personal navigation device (such as wearable personal navigation device 118), wherein access to the information, or portions thereof, is limited to the certain user and/or wearable personal navigation device.

Content generated by a user's actions may not be retained by the travel assistance system 100 (including the interface system 102, the beacons 110, and/or the wearable personal navigation devices 126) unless directed to do so by the person associated with the activity.

Access to user generated information associated with wearable personal navigation devices 118 may be accessed by the user or assigned owner, first responders based upon the immediate health status of the or user should there be immediate need of medical assistance, exhibited signs of being lost, disoriented or other signs of physical stress, distress or an alert system that identifies the wearable personal navigation devices 118 associated with the individual is issued by the appropriate authorities. Further, a user may initiate action that summons assistance via the travel assistance system 100 (which may be initiated via the wearable personal navigation devices 118).

The beacons 110, the interface system 102, and/or the wearable personal navigation devices 126 may not retain identifying information that can be linked to a unique person or persons, but may retain information on the types of devices used to retrieve data or mark location based upon data contained or transmitted by the beacons 110, geo-proximity plugs, the interface system 102, and/or the wearable personal navigation devices 118.

The beacons 110 may include data collection, retention, processing, transmission, sensing technology, and other technology or applications that may further support point-to-point navigation and communication either through its own routing and internet protocol (IP) or conversion of existing IPs for transmission over the beacons 110 should the data meet certain criterion and is deemed to pose low risk to the travel assistance system 100 (including the communication system 108).

A geo-proximity plug may be a device and/or object that can be connected to a device and/or object that is not wireless-enabled and allows the device to communicate with, and/or be recognized by, the travel assistance system 100, or components thereof. For example, objects that may be along a navigation path (such as trash receptacles, entrances, exits, elevators, escalators, buoys, posts, gates, signs, lamp posts, crossing locations, statues, and/or trees) may have geo-proximity plugs affixed, permanently or semi-permanently, to the interior and/or exterior of objects. The geo-proximity plugs may transmit data to the travel assistance system 100, or components thereof.

The interface system 102 may further include a communication system 108. The communication system 108 may facilitate wireless and/or wired communication among the interface system 102 and other devices, including wearable personal navigation devices (such as wearable personal navigation devices 118), geo-proximity plugs, and/or beacons (such as beacons 110). Some examples of wireless communication (which should be understood to be non-limiting) that may be implemented the communication system 108 may include wireless fidelity (Wi-Fi) communication, near field communication, Bluetooth communication, wireless local area network (WLAN) communication, infrared (or other spectrum based means), radio waves, mobile communication, other form of wireless communication, or some combination thereof.

The travel assistance system 100 may further include one or more beacons 110. For simplicity, a single beacon 110 is described herein. However, it is to be understood that each of the one or more beacons 110 may include the features of the beacon 110 described. The beacon 110 may include a communication system 112. The communication system 112 may include one or more of the features of the communication system 108 and may facilitate communication among the beacon 110 and other devices, including the wearable personal navigation devices and/or the interface system 102. In some embodiments, wireless communication of the communication system 112 may be limited to an operating range (see operating range 608 and operating range 610 of FIG. 6) of the beacon 110. For example, the communication system 112 may facilitate communication among the beacon 110 and wearable personal navigation devices within the operating range of the beacon 110.

The beacon 110 may further include one or more sensors 114. The sensors 114 may sense objects (including physical and/or structural features, which may incorporate wireless communication technology, such as geo-proximity plugs or other similar technology) within the operating range of the beacon 110. The sensors 114 may sense locations of the objects relative to the beacon 110 with relatively high precision (within one foot). The sensors 114 may emit a sound (and/or may collaborate with other technology to emit a sound) and sense locations of objects based on a direction from which reflected sounds are received and/or the time for the reflected sounds to be received after the initial sound is emitted. In these embodiments, the sensors 114 may include sonar systems to sense the locations and/or proximity of objects that are fixed or in motion. In some embodiments, the sensors 114 may sense the locations of the objects via other methods, including emitting light and sensing reflected light (time and direction), capturing an image and identifying the objects within the image, transmitting a message (such as via the communication system 112) to the objects and determining time periods to receive responses to the message, or some combination thereof. Further, in some embodiments, the sensors 114 may sense locations of the wearable personal navigation devices within the operating region of the beacon 110. The beacon 110 may transmit the sensed locations of the objects and/or the wearable personal navigation devices to the interface system 102 via the communication system 112, wherein the interface system 102 may determine the locations of the objects and/or the wearable personal navigation devices based, at least in part, on the sensed locations.

The beacon 110 may further include one or memory devices 116. The memory devices 116 may include one or more of the features of the memory devices 106. The memory devices 116 may store the sensed locations of the objects sensed by the sensors 114. Further, the memory device 116 may exclude from storage user personal identifiable information of the user. The memory devices 116 may store the sensed locations until the sensed locations are transmitted to the interface system 102, for a predetermined time period, until a prompt to delete the sensed locations is received, or some combination thereof. In some embodiments, the beacons 110 may be omitted.

The beacon 110 may be a wireless location validation and/or homing device that may communicate with a full range of wireless devices to identify, authenticate, protect against nonrepudiation, authorize, or validate a physical location.

The beacon 110 may be designed to manage signal processing in near real time to meet the demand from wireless devices either alone or in collaboration with other beacons, system resources, or collaboratively among system interfacing devices to accomplished the most efficient and effective use of resources given routine or emergency conditions.

The interface system 102 and the beacons 110 may be referred to throughout this disclosure as a network. Further, each of the interface system 102 and the beacons 110 may be referred to as a node of the network. For example, when a device (such as the wearable personal navigation devices 118) is referred to as communicating with a node of the network, the device may be communicating with the interface system 102 or one of the beacons 110.

The travel assistance system 100 may further include one or more wearable personal navigation devices 118. The wearable personal navigation devices 118 may be worn by users of the travel assistance system 100. Further, the wearable personal navigation devices 118 may provide directions to a destination, as is described throughout this disclosure. In some embodiments, the wearable personal navigation devices 118 may include a wireless device (such as a cell phone, smart phone, personal digital assistant, smart watch, or other similar wireless devices) that includes a computer readable media device that includes instructions that, when executed by the wireless device, cause the wireless device to perform one or more of the operations performed by the wearable personal navigation devices 118 described throughout this disclosure.

In some embodiments, the wearable personal navigation devices 118 may be comprised of a layer of thin lightweight material with durable micro-sensors woven into fabric, or incorporated into wearable items such as badges, pins, belts, buttons, threads, adhesives, polymers, metals, synthetics, or sensory based upon characteristics or properties of the user. Further, the wearable personal navigation devices 118 may be applied semi-permanently or temporarily in the form of appliques, buttons, pins, badges, tokens, etc.

In some embodiments, the wearable personal navigation devices 118 may be in the form of a vest, or two piece garment designed to be an undergarment or outerwear that incorporates a communication system that may use touch sensory communication through the use of pats, patterns, designs, thrums, that translate wireless information regarding direction, availability, safety, security, or other information to secure and provision travel to a desired location. Further, in these embodiments, the wearable personal navigation devices 118 may augment or support nonverbal guidance information to the user through the skin, which is not only the body's largest organ, but one of its oldest and most refined communication systems. This means of communication can be an alternative to audio, video, or image instruction, which may consume a great deal of power. Sensor pattern communicated to the skin can quickly alert the user to sudden introduction of obstacles in their path or route of travel. Further, in these embodiments, the wearable personal navigation devices 118 can serve as the foundation of reducing reliance upon canes and guide animals for navigation. The wearable personal navigation devices 118 can support navigation by non-visually impaired users in rooms with low light or no light, giving an option for using illumination or not to navigate a space.

In some embodiments, each of the wearable personal navigation devices 118 may be associated with a certain user. For example, one of the wearable personal navigation devices 118 may be associated with a certain user via the wearable personal navigation device 118 being registered to the certain user, the certain user entering credentials (such as a user name and password, or other security access information) into the wearable personal navigation device 118, another device or devices associated with the user being within a predetermined distance of the wearable personal navigation device 118, or some combination thereof. The wearable personal navigation devices 118 may limit access to the wearable personal navigation devices 118 or access to personal information associated with the certain user to the certain users to which the wearable personal navigation devices 118 are associated. The wearable personal navigation devices 118 (and/or the entirety of the travel assistance system 100, including the interface system 102 and/or the beacons 110) may implement design data security and/or privacy protocols known to one having ordinary skill in the art to limit access to the personal information to the certain users to which the wearable personal navigation devices 118 are associated.

In some embodiments, the travel assistance system 100 may be used for group travel management of individuals engaged in a group activity. For example, the travel assistance system 100 can be used for a family outing with adults and young children. The travel assistance system 100 may keep up with where each individual is and/or may be, communicate where they are allowed to be, provide navigation guidance to get them to where they need to be, support going to the location where a member of the group is and/or may be located, or some combination thereof.

For simplicity, a single wearable personal navigation device 118 is described below. However, it is to be understood that each of the one or more wearable personal navigation devices 118 may include the features of the wearable personal navigation device 118 described.

The wearable personal navigation device 118 may include a processor 122. The processor 122 may perform one or more of the operations described as being performed by the wearable personal navigation device 118 and/or the processor 122 described throughout this disclosure. While the processor 122 is referred to in the singular form, it is to be understood that the processor 122 may include one or more processors that perform the operations.

The wearable personal navigation device 118 may further include one or more memory devices 124. The memory devices 124 may include one or more random access memory (RAM) devices and/or read only memory (ROM) devices. The memory devices 124 may store one or more instructions that, when executed by the wearable personal navigation device 118, cause the wearable personal navigation device 118 to perform one or more of the operations described throughout this disclosure. The memory devices 124 may store information received by the wearable personal navigation device 118 and/or provided by the wearable personal navigation device 118, such as one or more navigation paths, ratings associated with the navigation paths, one or more representation of images, one or more indications of objects, user feedback, or some combination thereof, as described further throughout this disclosure. Further, the memory devices 124 may store information sensed by sensors (see sensors 126) of the wearable personal navigation device 118, such as images, data captured by the beacons 110 based upon proximity, distances to objects, location of objects, and/or other information sensed by the sensors. Stored data can aid in the retracing of a navigation path to originating points, as well support repeat use of the navigation data in future travels in the same area.

The wearable personal navigation device 118 may further include a communication system 120. The communication system 120 may include one or more of the features of the communication system 108. The communication system 120 may facilitate wireless and/or wired communication among the wearable personal navigation device 118 and the beacons 110. The beacons 110 may relay communications between the interface system 102 and the wearable personal navigation device 118, allowing the interface system 102 and the wearable personal navigation device 118 to communicate with each other.

In some embodiments, the wearable personal navigation device 118 may communicate directly (i.e. not through relay by the beacons 110) with the interface system 102. For example, in embodiments where the beacons 110 are omitted, the wearable personal navigation device 118 may communicate directly with the interface system 102 via the communication system 120.

The wearable personal navigation device 118 may further include one or more sensors 126. The sensors 126 may sense information associated with an environment surrounding the wearable personal navigation device 118, such as objects within the environment, an amount of light within the environment, an amount of noise within the environment, or some combination thereof.

The sensors 126 may include one or more cameras that capture images of the environment. The cameras may continuously capture the images, capture the images at predetermined intervals, capture the images in response to a trigger, or some combination thereof. The wearable personal navigation device 118 may transmit representations of the images to the interface system 102, via the communication system 120, wherein the interface system 102 may analyze the representations of the images identify and/or determine information associated with the environment. The interface system 102 and/or the wearable personal navigation devices 118 may reduce images to non-visual assistive data that removes non-permanent objects (such as persons, animals, vehicles, etc.). The interface system 102 and/or the wearable personal navigation devices 118 may then generate, through identification of sufficient fixed unique points that are validated by data captured by the beacons 110, a unique address within the travel assistance system 100. The non-visual assistive information may be stored and later used to match images that are captured to identify a unique location or reduce the number of possible locations. For example, the interface system 102 may determine the location of one or more objects within the environment based on the representations of the images. Further, the global beacon system can communicate to the wearable personal navigation devices 118 locations, within centimeters or fractions of an inch, as well as allow digital still images or videos, or scanned photographic images or digitized analogue data to be matched to stored data.

In some embodiments, the wearable personal navigation device 118 may analyze the captured images rather than the representations of the images being transmitted to the interface system 102 and analyzed by the interface system 102. The wearable personal navigation device 118 may identify and/or determine information associated with the environment and transmit the information associated with the environment to the interface system 102. Further, in some embodiments, the wearable personal navigation device 118 may limit the transmissions of the information associated with the environment to the interface system 102 to instances where the wearable personal navigation device 118 identifies and/or determines information associated with the environment that has changed (such as determining that an amount of light within the environment has decreased, which may be due to lights shutting off during a power outage), is different than expected (such as identifying a new or unexpected object within the environment), or some combination thereof.

In some embodiments, the sensors 126 may include a sonar system. The sonar system may emit a sound and sense locations of objects within the environment based on a direction from which reflected sounds are received and/or the time for the reflected sounds to be received after the initial sound is emitted. In some embodiments, the sensors 126 may emit light and sense reflected light (time and direction) to sense the locations of the objects within the environment.

Further, in some embodiments, the sensors 126 may include pressure sensors or other sensors that can sense contact with an object. For example, the sensors 126 may be placed within a shoe (such as a toe, sole, and/or heel of the shoe, sock, or other footwear) and may identify when the shoe makes contact with an object. The wearable personal navigation device 118 may identify a location of the object based on the sensors 126 sensing contact with the object. Further, the navigation device may detect and communicate type of surface, and surface conditions.

Still further, in some embodiments, the sensors 126 may sense motion of the wearable personal navigation device 118. The sensors 126 may further sense a translation distance of the wearable personal navigation device 118 between periods when the wearable personal navigation device 118 is not moving. For example, the sensors 126 may be included in a shoe and may sense when the shoe is moving and not moving. The sensors 126 may determine the translation distance between the two consecutive periods when the shoe is not moving, which may be equal to a stride of a user of the shoe. Accordingly, the wearable personal navigation device 118 and/or the interface system 102 may determine a distance of a stride of the user based on the translation distance. In some embodiments, the sensors 126 may be omitted.

In some embodiments, the wearable personal navigation device 118 may receive an inquiry from the user for identification of an object within the environment around the wearable personal navigation device 118. The object may be in or motion or at rest. Further, in some embodiments, the wearable personal navigation device 118 may receive a request for identification of a location, sound, external sensation, and/or environmental condition within the environment around the wearable personal navigation device. The wearable personal navigation device 118 may communicate with the interface system 102 to identify the requested object, location, sound external sensation, and/or environmental condition and the wearable personal navigation device 118 may indicate the identification to the user. The interface system 102 may communicate with network systems (such as the network systems 202 (FIG. 2)) to gather information to perform the identification. For example, the user may hear a dog bark within the environment around the wearable personal navigation device 118. The user may request that the user personal navigation device 118 identify what kind of dog barked, the travel assistance system 100 may identify the kind of dog based on the bark, the direction, the amplitude, the modulation, and/or other details. The wearable personal navigation device 118 may indicate the kind of dog to the user, such as by indicating that the dog is a Sheppard puppy, located three feet away, and is on a leash. The travel assistance system 100 may have access to information that may allow for analysis of audio, visual, and/or sensor input that may support the provision of accurate information, timely information, and/or useful information to the user.

In some embodiments, the wearable personal navigation devices 118 may be comprised of a layer of thin lightweight material with durable micro-sensors woven into fabric, or incorporated into wearable items such as badges, pins, belts, buttons, threads, adhesives, polymers, metals, synthetics, or sensory based upon characteristics or properties of the user. Further, the wearable personal navigation devices 118 may be applied semi-permanently or temporarily in the form of appliques, buttons, pins, badges, tokens, or other means that are temporary or non-permanent.

In some embodiments, a wearable lightweight material may support communication for the travel assistance system 100, which may be in the form of a vest, or two piece garment designed to be worn as an undergarment or outerwear that incorporates a communication system that uses touch sensory communication through the use of pats, patterns, designs, thrums, that translate wireless information regarding direction, availability, safety, security, or other information to secure and provision travel to a desired location.

In some embodiments the travel assistance system 100 may augment or supports nonverbal guidance information to the user through the skin, which is not only the body's largest organ, but also one of its oldest and most refined communication systems. This means of communication can range from an alternative to audio, video, or image instruction, which consume a great deal of power. Sensor pattern communicated to the skin can quickly alert the user to sudden introduction of obstacles in their path or route of travel. For example, a user that is in a blackout or in area with low light or no lighting may be assisted in navigating to a location of safety without a flashlight or visual aids as the right sleeve of a garment communicates a tap to the right sleeve with an audible "42 inches" followed by a tone that continues until the person has rotated their forward point of reference sufficiently, the tone changes and an audible "move" and/or a tap on the right mid-calf indicates when foot to move, and the shoe vibrates to confirm the guidance to proceed. The navigation path may be continually evaluated for safety and security that is used to update guidance information. Images that can be used to communicate to touch using geometric shapes.

The wearable personal navigation device 118 may further include one or more indicators 128. The indicators 128 may indicate a direction of travel that a user of the wearable personal navigation device 118 is to proceed from a current location. The processor 122 may determine the direction of travel based on a navigation path received from the interface system 102 (as described further throughout this disclosure) and cause the indicators 128 to indicate the direction of travel.

The indicators 128 may include one or more speakers that indicate the direction in travel. The speakers may emit a sound and/or words that indicate the direction of travel. In embodiments where the speakers emit sound, the sound may be emitted from the direction of travel, indicating to the user that the user is to proceed in the direction of the sound. In embodiments where the speakers emit words, the words may include the direction of travel and/or a distance that the user is to proceed in the direction of travel (which may be indicated in an amount of steps and/or other measurement of the distance).

In some embodiments, the indicators 128 may include one or more actuators that apply a force to the user of the wearable personal navigation device 118 and/or generate a touch pattern. The actuators may apply the force, and/or generate a touch pattern to indicate a direction, and/or rate, of travel in which the user of the wearable personal navigation device 118 is to proceed from the current location. In a touch pattern implementation, the user may contact the actuators and feel the touch pattern sensation to determine the direction, and/or rate, of travel in which the user of the wearable personal navigation device 118 is to proceed from the current location. For example, the actuators may be included in a belt and may apply a force to the user in the direction of travel, and/or generate a touch pattern that the user may sense, to indicate the direction of travel. In some embodiments, the force and/or touch pattern may be applied to and/or sensed by the user's arm to indicate the direction of travel.

In some embodiments, travel assistance system 100 may implement an emergency alert procedure that communicates system wide (i.e. the interface system 102 may communicate an emergency alert to the beacons 110 and/or the wearable personal navigation devices 118) based upon geo-location or geo-proximity official advisories regarding conditions that may threaten safety, security or wellbeing of a user. Further, the travel assistance system 100 may provide guidance information, which may be activated to assist users in reaching safety.

Figure 2:
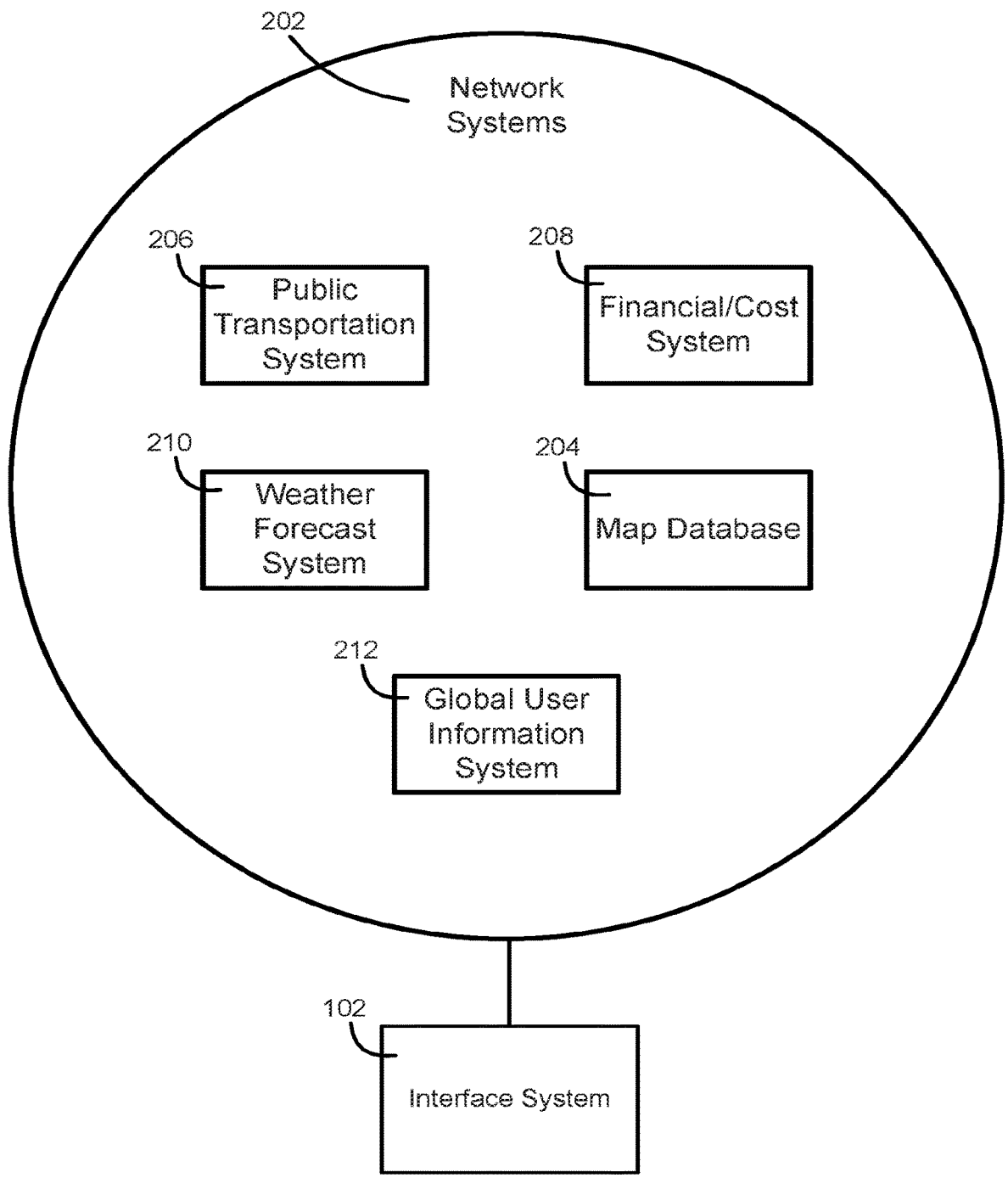
FIG. 2 illustrates example accessible network systems accessible by the travel assistance system of FIG. 1, according to various embodiments.

FIG. 2 illustrates example accessible network systems 202 accessible by the travel assistance system 100 of FIG. 1, according to various embodiments. In particular, the network systems 202 may be accessible by the interface system 102 of the travel assistance system 100. The interface system 102 may retrieve information from the network systems 202, which the interface system 102 may utilize for generating a navigation path for one or more of the wearable personal navigation devices 118 (FIG. 1).

The network systems 202 may include a map database 204. The map database 204 may include one or more maps. Further, the map database 204 may produce one or more navigation paths between locations based on the maps. The map database 204 may support access to, in near real time, one or more maps within a certain time frame of a request for a navigation path and/or a map. In some embodiments, the map database 204 may support access to, in near real time, one or more maps within the certain time frame of a request for a navigation path and/or a map. The time frame may be selected to achieve a predetermined accuracy for map provisioning services. The map database 204 may include information that uses other means of uniquely identifies a location that is not in the form of an image or map. The map database 204 may return one or more navigation paths and/or maps that include a starting point and a destination in response to receiving a request for a navigation path and/or map from the starting point to the destination. For example, the interface system 102 may transmit the request for the navigation path and/or map to the map database 204 and receive one or more navigation paths and/or maps from the map database 204 in response to the request.

In some embodiments, the map database 204 may include celestial charts, maps and astronomical data. The interface system 102 and/or the map database 204 may identify a celestial chart, map, and/or astronomical data for use by the travel assistance system 100 based on an image captured by the wearable personal navigation devices 118 (and/or another mobile device) or other image recording, including video of the sky above the user. The interface system 102 may use the image captured by the wearable personal navigation devices 118 (and/or another mobile device) or other image recording, including video of the sky above the user to determine a location of the user and generate a navigation path to a destination, safety, or to support recue, and/or location efforts by registered users and/or emergency personal.

The network systems 202 may further include one or more public transportation system information databases 206. The public transportation system information databases 206 may include information associated with one or more different types of public transportation (such as times that the public transportation is running and/or where the public transportation is running). The map database 204 and/or the interface system 102 may access the public transportation system information databases 206 and may utilize information retrieved from the public transportation system information databases 206 to generate one or more navigation paths and/or maps. For example, the map database 204 may retrieve a bus route from the public transportation system information database 206 and generate a navigation path that utilizes a bus associated with the bus route.

The network systems 202 may further include a financial/cost system 208. The financial/cost system 208 may include costs of one or more types of transportation. The map database 204 and/or the interface system 102 may access the financial/cost system 208 and may retrieve cost information associated with one or more types of transportation. The map database 204 and/or the interface system 102 may utilize the cost information to generate a navigation path and/or a map. For example, the map database 204 may retrieve cost information for one or more types of transportation from the financial/cost system 208 and may generate a navigation path from a starting point to a destination that utilizes the cheapest transportation of the types of transportation.

The network systems 202 may further include a weather forecast system 210. The weather forecast system 210 may include one or more weather forecasts. The weather forecast may rely upon humidity, moisture, air pollution, and allergens sensors within a vicinity of the navigation path, as well as along the navigation path. The map database 204 and/or the interface system 102 may access the weather forecast system 210 and may retrieve one or more weather forecasts for one or more navigation paths from a starting point to a destination. The map database 204 and/or the interface system 102 may utilize the weather forecasts to generate a navigation path and/or a map. For example, the map database 204 may retrieve weather forecasts from the weather forecast system 210 and may generate a navigation path that utilizes a certain type of transportation based on the weather forecasts, such as generating a navigation path that utilizes a bus if the weather forecasts indicate there is rain along the navigation path from the starting point to the destination.

The network systems 202 may further include a global user information system 212. The global user information system 212 may include preferences of one or more users of the travel assistance system 100, navigation paths utilized by users of the travel assistance system 100, ratings (such as difficulty ratings) associated with navigation paths, or some combination thereof. The map database 204 and/or the interface system 102 may access the global user information system 212 and may retrieve one or more information from the global user information system utilized for generating a navigation path and/or map. For example, the map database 204 may retrieve ratings associated with multiple navigation paths and may generate a navigation path from a starting point to a destination based on the ratings associated with the multiple navigation paths. In some embodiments, the global user information system 212 may be included in the interface system 102 rather than the network systems 202 and may be accessible by the interface system 102, but not by the map database 204. In some embodiments, the user may plan a trip without being in the location where the travel will begin or end. The travel assistance system 100 may discard or store information (depending on settings and/or user indications of whether to discard or store the information) for the planned trip for later use.

In some embodiments, one or more of the public transportation system information databases 206, the financial/cost system 208, the weather forecast system 210, and/or the global user information system 212 may be omitted. Further, in some examples, the map database 204 may be utilized to generate the navigation paths and/or maps without information from the other systems within the network systems 202.

Figure 3:
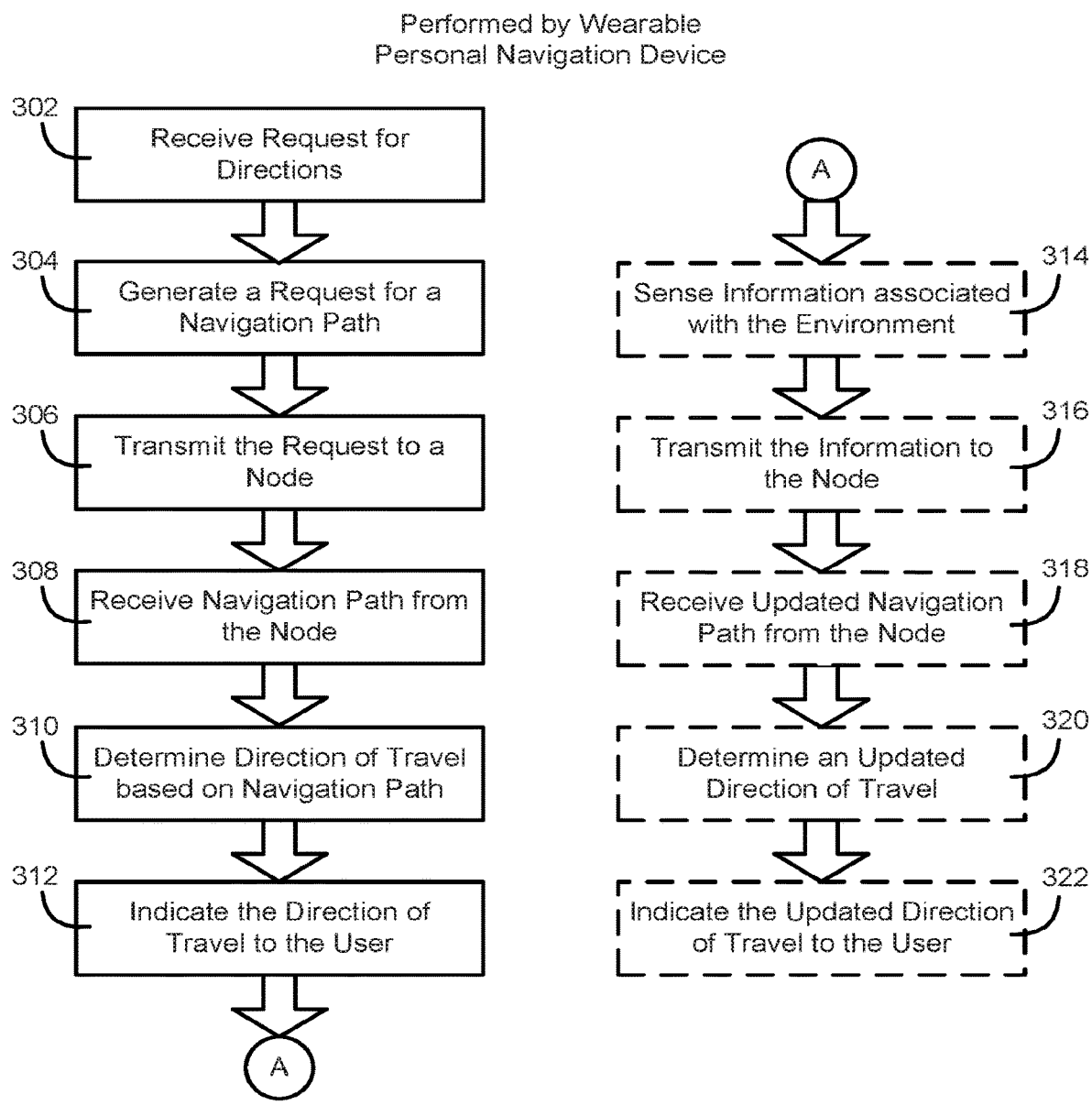
FIG. 3 illustrates a simplified flow diagram of an example process to be performed by a wearable personal navigation device of the travel assistance system of FIG. 1, according to various embodiments.

FIG. 3 illustrates a simplified flow diagram of an example process 300 to be performed by a wearable personal navigation device 118 (FIG. 1) of the travel assistance system 100 of FIG. 1, according to various embodiments.

In stage 302, the wearable personal navigation device 118 may receive a request for directions to a destination. The request for directions to the destination may be received from a user of the wearable personal navigation device 118. The destination can be indicated be the user in the request for directions. In some embodiments, the destination may be set to be a location of another one of the wearable personal navigation devices 118 or a wireless device, which may be utilized for directing emergency crews to individuals in an emergency situation. Further, in some embodiments, the request for directions to the destination may be automatically initiated in response to a change in the environment (such as the environment becoming dark and/or an emergency situation) and the destination may be an exit from the environment.

In stage 304, the wearable personal navigation device 118 may generate a request for a navigation path. The request for the navigation path may include an indication of the destination requested by the user. In some embodiments, the request for the navigation path may further include a starting point, which may be a current location of the wearable personal navigation device 118. The wearable personal navigation device 118 may determine the current location based on an input of the user or may determine the current location based on communication transmitted via the communication system 120, such as communication with a global positioning system that may indicate the current location of the wearable personal navigation device 118.

In stage 306, the wearable personal navigation device 118 may transmit the request for the navigation path to a node of the network. The wearable personal navigation device 118 may transmit the request via the communication system 120 of the wearable personal navigation device 118.

In stage 308, the wearable personal navigation device 118 may receive a navigation path from the node of the network. The navigation path may have been generated by the interface system 102 (FIG. 1) of the travel assistance system 100. The interface system 102 may have retrieved a first navigation path and/or a map indicating a first navigation path from the map database 204 (FIG. 2). The first navigation path and/or the map indicating the first navigation path may have been generated by the map database 204 based on a map included in the map database 204.

The interface system 102 may analyze information associated with the environment surrounding the wearable personal navigation device 118 sensed by the sensors 114 (FIG. 1) of the beacons 110 (FIG. 1) and/or the sensors 126 (FIG. 1) of the wearable personal navigation device 118 or another wearable personal navigation device 118 (wherein the beacons 110 and the other personal wearable navigation device 118 may be collectively referred to as 'remote devices') to determine if there are any objects that impede the first navigation path indicated by the information. The information may include information previously sensed by the sensors 114 and/or the sensors 126, which may have been stored in the memory device 106 (FIG. 1) of the interface system 102 and/or retrieved from the global user information system 212 (FIG. 2). The objects may have been absent from the map included in the map database 204 due to map inadvertently generated without the objects, the generation of the map being prior to the introduction of the objects, the objects being temporarily introduced to the environment, or other similar reasons.

In response to determining that at least one object impedes the first navigation path, the interface system 102 may generate a second navigation path that includes at least one modification from the first navigation path, wherein the second navigation path avoids the objects that impede the first navigation path. In embodiments where the interface system 102 received the map from the map database 204, the interface system 102 may generate the second navigation path based on the map. In embodiments where the interface system 102 received the first navigation path from the map database 204, the interface system 102 may request another navigation path from the map database 204 that avoids the objects. In response to receiving the request for the other navigation path, the map database 204 may provide the second navigation path to the interface system 102.

In some instances, the interface system 102 may determine that an object impedes the first navigation path, although the object may be avoided by a user of the wearable personal navigation device 118 by providing notice of the object. For example, the object may be an uneven place in the sidewalk that a user could step over if notified of the uneven place. In this instance, the modification included in the second navigation path from the first navigation path may include an indication of the object and/or an indication to step up, down, or over (i.e. a modification in the vertical direction rather than the horizontal direction) to avoid the object.

In some embodiments, the interface system 102 may retrieve a difficulty rating associated with the first navigation path from the global user information system 212. The interface system 102 may compare the difficulty rating associated with the first navigation path with a maximum difficulty rating associated with a user of the wearable personal navigation device 118 to determine if the first navigation path is too difficult for the user to travel. In response to determining that the difficulty rating associated with the first navigation path is too difficult for the user, the interface system 102 may generate the second navigation path that is not too difficult for the user to travel or that does not have a difficulty rating associated with the second navigation path. In embodiments where the interface system 102 receives the map from the map database 204, the interface system 102 may generate the second navigation path based on the map and/or a difficulty rating associated with the second navigation path retrieved from the global user information system 212. In embodiments, where the interface system 102 received the first navigation path from the map database 204, the interface system 102 may request another navigation path from the map database 204 with a difficulty rating that is not too difficult for the user. In response to receiving the request for the other navigation path, the map database 204 may provide the second navigation path to the interface system 102. Alternatively, the interface system 102 may request another navigation path from the map database 204 and then access a difficulty rating associated with the new navigation path to determine if the new navigation path is too difficult for the user. Assuming the new navigation path is not too difficult for the user, the interface system 102 may return the new navigation path as the second navigation path. If the new navigation path is too difficult for the user, the interface system 102 may repeat the process requesting another navigation path.

In stage 308, the wearable personal navigation device 118 may receive the second navigation path from the node of the network.

In stage 310, the wearable personal navigation device 118 may determine a direction of travel based on the second navigation path. The direction of travel may be based on a current location of the wearable personal navigation device 118 along the second navigation path, a direction that the wearable personal navigation device 118 is facing, a direction that the user of the wearable personal navigation device 118 is facing, or some combination thereof. The wearable personal navigation device 118 may determine the direction of travel as the direction that the user is to travel from the current location to remain on the second navigation path. The direction of travel may be updated as the user (wearing the wearable personal navigation device 118) travels along the second navigation path.

In stage 312, the wearable personal navigation device 118 may indicate the direction of travel to the user. The wearable personal navigation device 118 may indicate the direction of travel to the user via the indicators 128 (FIG. 1) of the wearable personal navigation device 118. The indicators 128 may indicate the direction of travel as described in relation to FIG. 1.

In some embodiments, the process 300 may terminate upon completion of stage 312, such that the wearable personal navigation device 118 continues to indicate the direction of travel along the second navigation path until the user arrives at the destination. In other embodiments, the process 300 may proceed to stage 314.

In stage 314, the wearable personal navigation device 118 may sense information associated with the environment surrounding the personal navigation device 118. The wearable personal navigation device 118 may utilize the sensors 126 to sense the object. In embodiments where the sensors 126 include one or more cameras, the sensors 126 may capture one or more images of the environment as the user (wearing the personal navigation device 118) travels along the second navigation path. In some embodiments, the processor 122 of the wearable personal navigation device 118 may analyze the images of the environment to identify an object that impedes travel along the second navigation path.

In embodiments where the sensors 126 include a sonar system, the wearable personal navigation device 118 may sense an object that impedes travel along the second navigation path via the sonar system. Further, in embodiments where the sensors 126 include one or more pressure sensors or other sensors that can sense contact with an object, the wearable personal navigation device 118 may sense an object that impedes travel along the second navigation path via contact with the object.

In stage 316, the wearable personal navigation device 118 may transmit the information associated with the environment to the node of the network. In embodiments where the wearable personal navigation device 118 captures the images and does not analyze the images, the wearable personal navigation device 118 may transmit one or more representations of the images to the node of the network. In response to receiving the one or more representations of the images, the interface system 102 may analyze the representations of the images to determine whether there is an object that impedes travel along the second navigation path. In response to determining that there is an object that impedes travel along the second navigation path, the interface system 102 may generate an updated navigation path from the second navigation path, wherein the updated navigation path avoids the object. The updated navigation path may have a starting location of the current location of the wearable personal navigation device 118 when the information is sensed and may lead to the destination. The interface system 102 may transmit the updated navigation path to the wearable personal navigation device 118.

In embodiments where the wearable navigation device 118 senses the object (via analysis of captured images, the sonar system, and/or contact with the object), the wearable navigation device 118 may transmit an indication of the presence of the object and a location of the object to the interface system 102. In response to receiving the indication, the interface system 102 may generate an updated navigation path from the second navigation path, wherein the updated navigation path avoids the object. The updated navigation path may have a starting location of the current location of the wearable personal navigation device 118 when the information is sensed and may lead to the destination. The interface system 102 may transmit the updated navigation path to the wearable personal navigation device 118.

In stage 318, the wearable navigation device 118 may receive the updated navigation path from the node of the network.

In stage 320, the wearable navigation device 118 may determine an updated direction of travel based on the updated navigation path. The direction of travel may be based on a current location of the wearable personal navigation device 118 along the updated navigation path, a direction that the wearable personal navigation device 118 is facing, a direction that the user of the wearable personal navigation device 118 is facing, or some combination thereof. The wearable personal navigation device 118 may determine the direction of travel as the direction that the user is to travel from the current location to remain on the updated navigation path. The direction of travel may be updated as the user (wearing the wearable personal navigation device 118) travels along the updated navigation path.

In stage 322, the wearable navigation device 118 may indicate the updated direction of travel to the user. The wearable personal navigation device 118 may indicate the updated direction of travel to the user via the indicators 128 of the wearable personal navigation device 118. The indicators 128 may indicate the updated direction of travel in a same manner as the direction of travel is indicated as described in relation to FIG. 1.

Figure 4:
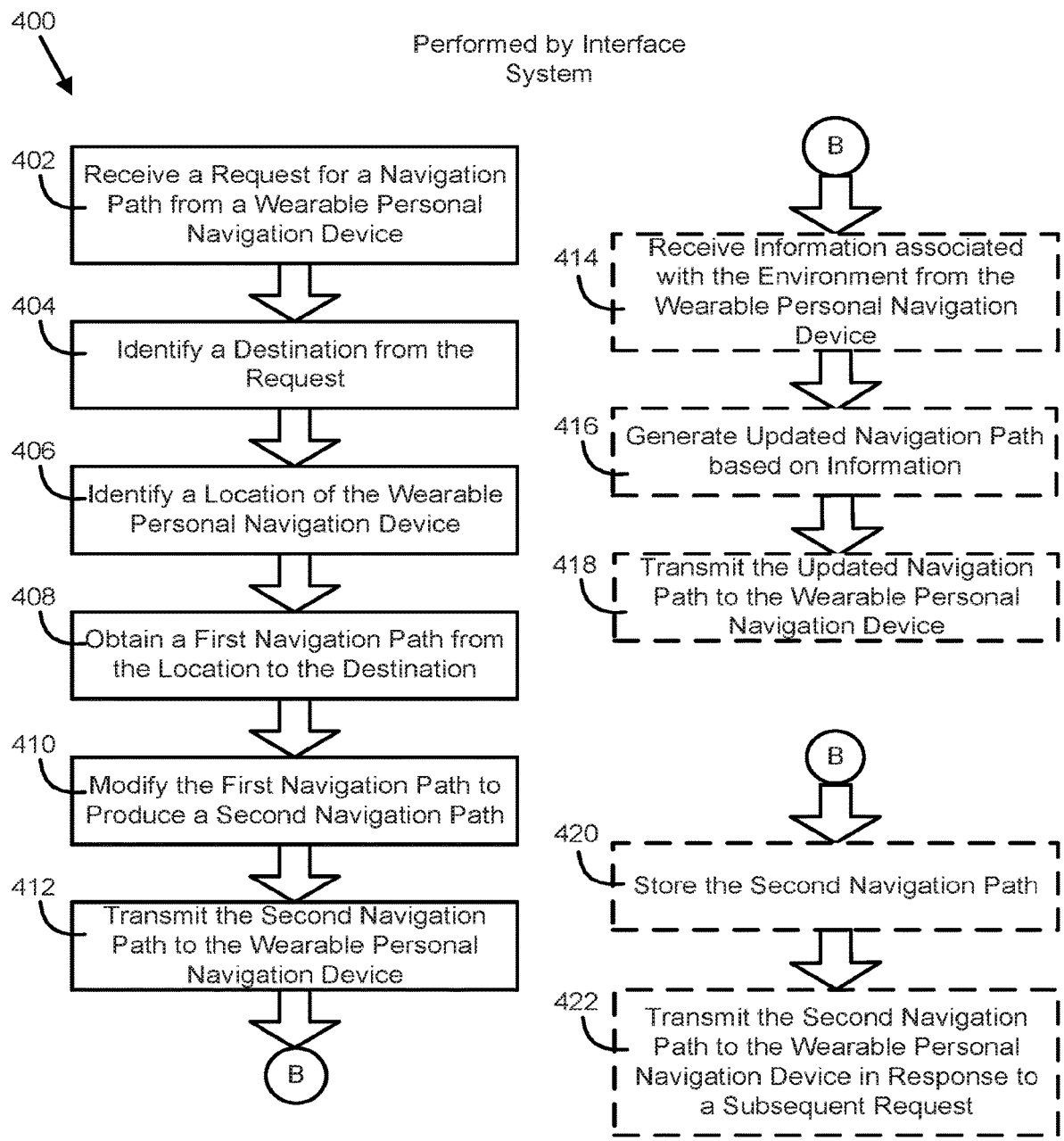
FIG. 4 illustrates a simplified flow diagram of an example process to be performed by an interface system of the travel assistance system of FIG. 1, according to various embodiments.

FIG. 4 illustrates a simplified flow diagram of an example process 400 to be performed by an interface system 102 of the travel assistance system 100 of FIG. 1, according to various embodiments.

In stage 402, the interface system 102 may receive a request for a navigation path from a wearable personal navigation device (such as the wearable personal navigation device 118).

In stage 404, the interface system 102 may identify a destination from the request. The interface system 102 may identify an indication of the destination in the request for the navigation path. In some embodiments, the request for the navigation path may indicate that the destination is to be a default destination based on the current location of the wearable personal navigation device and/or the circumstances that caused the request to be generated, wherein the circumstances may be indicated in the request. For example, if the request was generated in response to an emergency situation, the default destination may be an exit of the structure in which the wearable personal navigation device is located.

In stage 406, the interface system 102 may identify a current location of the wearable personal navigation device. The interface system 102 may identify an indication of the current location of the wearable personal navigation device in the request for the navigation path. In some embodiments, the request may include an indication of a starting point, and the interface system 102 may identify the starting point and utilize the starting point in place of the current location of the wearable personal navigation device in the process 400. Further, in some embodiments, the request may not include an indication of the current location and the interface system 102 may query a global positioning system and/or compare astronomical chart information based upon location, time of year, calendar date, time of day and direction to which the image of the sky is captured to determine a current location of the wearable personal navigation device.

In stage 408, the interface system 102 may obtain a first navigation path from the current location of the wearable personal navigation device to the destination. The interface system 102 may obtain the first navigation path form the map database 204 (FIG. 2). The map database 204 may return the first navigation path or a map that includes the first navigation path to the interface system 102.

In stage 410, the interface system 102 may modify to the first navigation path to produce a second navigation path. The interface system 102 may modify the first navigation path based on information associated with the environment surrounding the wearable personal navigation device. The information may be retrieved from the global user information system 212 (FIG. 2). The information associated with the environment may have been previously sensed by sensors (such as the sensors 126 (FIG. 1)) of the wearable personal navigation device or another wearable personal navigation device, by the sensors 114 of the beacons 110 (FIG. 1) (wherein the beacons 110 and the other wearable personal navigation device may be collectively referred to as 'remote device'). The interface system 102 may analyze the information and determine if there are any objects that impede the first navigation path. The objects may have been absent from the map included in the map database 204 due to map inadvertently generated without the objects, the generation of the map being prior to the introduction of the objects, the objects being temporarily introduced to the environment, or other similar reasons.

In response to determining that at least one object impedes the first navigation path, the interface system 102 may generate a second navigation path that includes at least one modification from the first navigation path, wherein the second navigation path avoids the objects that impede the first navigation path. In embodiments where the interface system 102 received the map from the map database 204, the interface system 102 may generate the second navigation path based on the map. In embodiments where the interface system 102 received the first navigation path from the map database 204, the interface system 102 may request another navigation path from the map database 204 that avoids the objects. In response to receiving the request for the other navigation path, the map database 204 may provide the second navigation path to the interface system 102.

In some instances, the interface system 102 may determine that an object impedes the first navigation path, although the object may be avoided by a user of the wearable personal navigation device 118 by providing notice of the object. For example, the object may be a crack in the sidewalk that a user could step over if notified of the crack. In this instance, the modification included in the second navigation path from the first navigation path may include an indication of the object and/or an indication to step up, down, or over (i.e. a modification in the vertical direction rather than the horizontal direction) to avoid the object.

In some embodiments, the interface system 102 may retrieve a difficulty rating associated with the first navigation path from the global user information system 212. The interface system 102 may compare the difficulty rating associated with the first navigation path with a maximum difficulty rating associated with a user of the wearable personal navigation device 118 to determine if the first navigation path is too difficult for the user to travel. In response to determining that the difficulty rating associated with the first navigation path is too difficult for the user, the interface system 102 may generate the second navigation path that is not too difficult for the user to travel or that does not have a difficulty rating associated with the second navigation path. In embodiments where the interface system 102 receives the map from the map database 204, the interface system 102 may generate the second navigation path based on the map and/or a difficulty rating associated with the second navigation path retrieved from the global user information system 212. In embodiments, where the interface system 102 received the first navigation path from the map database 204, the interface system 102 may request another navigation path from the map database 204 with a difficulty rating that is not too difficult for the user. In response to receiving the request for the other navigation path, the map database 204 may provide the second navigation path to the interface system 102. Alternatively, the interface system 102 may request another navigation path from the map database 204 and then access a difficulty rating associated with the new navigation path to determine if the new navigation path is too difficult for the user. Assuming the new navigation path is not too difficult for the user, the interface system 102 may return the new navigation path as the second navigation path. If the new navigation path is too difficult for the user, the interface system 102 may repeat the process requesting another navigation path.

In stage 412, the interface system 102 may transmit the second navigation path to the wearable personal navigation device. In some embodiments, the process 400 may terminate upon completion of stage 412. In other embodiments, the process 400 may proceed to stage 414. Further, in some embodiments, the process 400 may proceed to stage 420.

In stage 414, the interface system 102 may receive information associated with the environment from the wearable personal navigation device. The information may be sensed by the wearable personal navigation device as the user is traveling along the second navigation path and may be transmitted by the wearable personal navigation device to the interface system 102 in response to being sensed. The information may include one or more representations of images captured by the wearable personal navigation device. In some embodiments, the information may include an indication of a presence of an object that impedes travel along the second navigation path and a location of the object.

In stage 416, the interface system 102 may generate an updated navigation path based on the information. In response to receiving the one or more representations of the images, the interface system 102 may analyze the representations of the images to determine whether there is an object that impedes travel along the second navigation path. In response to determining that there is an object that impedes travel along the second navigation path, the interface system 102 may generate an updated navigation path from the second navigation path, wherein the updated navigation path avoids the object. The updated navigation path may have a starting location of the current location of the wearable personal navigation device when the information is sensed and may lead to the destination.

In some embodiments where the information includes the indication of the presence of the object, the interface system 102 may generate an updated navigation path from the second navigation path in response to receiving the indication, wherein the updated navigation path avoids the object. The updated navigation path may have a starting location of the current location of the wearable personal navigation device when the information is sensed and may lead to the destination.

In stage 418, the interface system 102 may transmit the updated navigation path to the wearable personal navigation path.

In stage 420, the interface system 102 may store the second navigation path. The interface system 102 may store the second navigation path in global user information system 212 and/or in the memory devices 106 of the interface system 102.

In stage 422, the interface system 102 may transmit the second navigation path to a wearable personal navigation device in response to a subsequent request from the current location to the destination. The wearable personal navigation device may be the same wearable personal navigation device that transmitted the request that was received by the interface system 102 in stage 402 or may be a different wearable personal navigation device.

Figure 5:
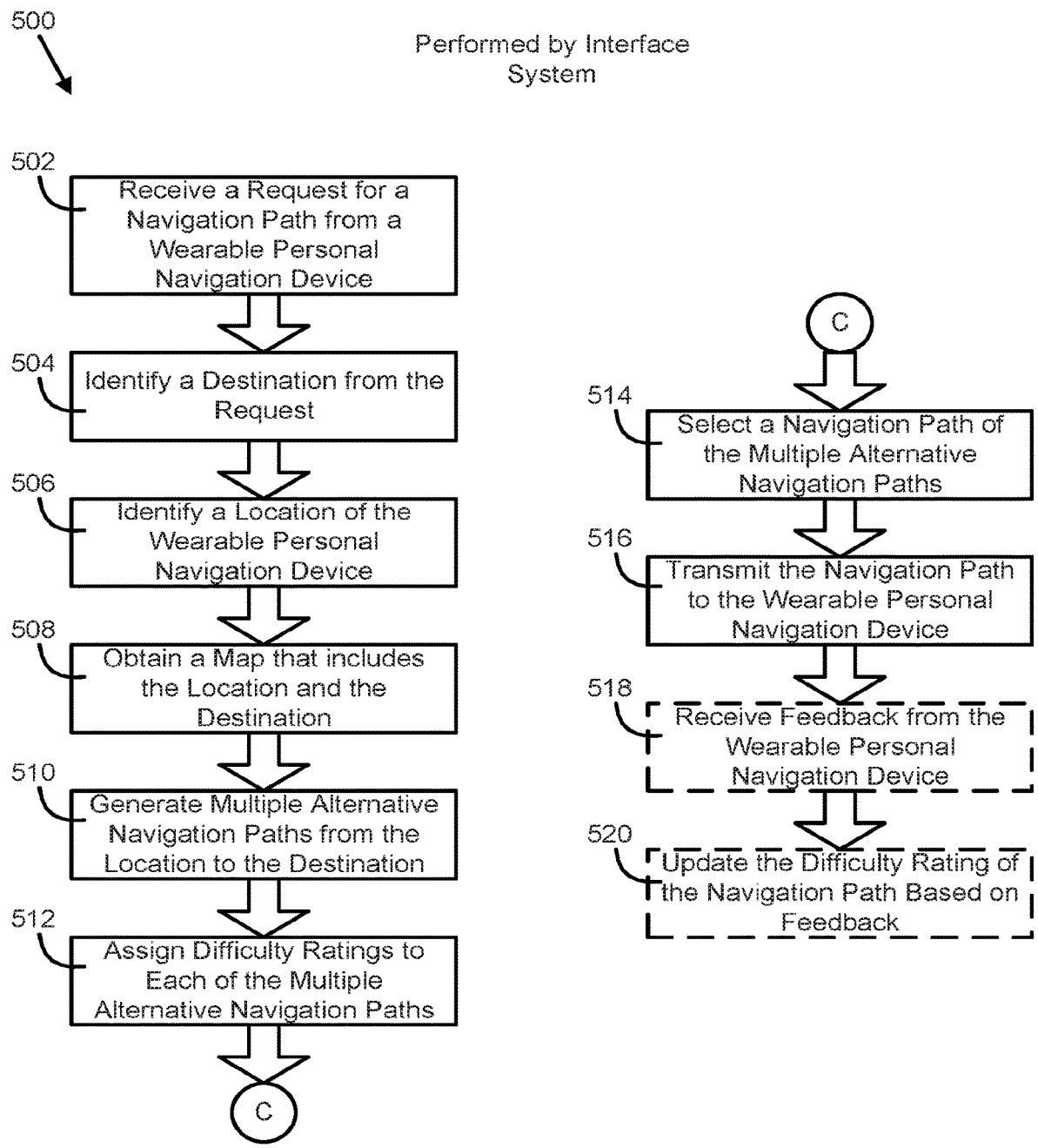
FIG. 5 illustrates a simplified flow diagram of another example process to be performed by an interface system of the travel assistance system of FIG. 1, according to various embodiments.

FIG. 5 illustrates a simplified flow diagram of another example process 500 to be performed by the interface system 102 (FIG. 1) of the travel assistance system 100 of FIG. 1, according to various embodiments.

In stage 502, the interface system 102 may receive a request for a navigation from a wearable personal navigation device. Stage 502 may include one or more of the features of stage 402 (FIG. 4).

In stage 504, the interface system 102 may identify a destination from the request. Stage 504 may include one or more of the features of stage 404 (FIG. 4).

In stage 506, the interface system 102 may identify a location of the wearable personal navigation device. Stage 506 may include one or more of the features of stage 406 (FIG. 4).

In stage 508, the interface system 102 may obtain a map that includes the location and the destination. The interface system 102 may obtain the map from the map database 204 (FIG. 2).

In stage 510, the interface system 102 may generate multiple alternative navigation paths from the location to the destination. The interface system 102 may generate the multiple alternative navigation paths based on the map, wherein each of the multiple alternative navigation paths lead from the location to the destination along different paths shown on the map.

In stage 512, the interface system 102 may assign difficulty ratings to each of the multiple alternative navigation paths. The interface system 102 may access difficulty ratings for each of the multiple alternative navigation paths from the global user information system 212 (FIG. 2) and may assign the difficulty ratings to each of the corresponding multiple alternative navigation paths.

In some embodiments, the interface system 102 may access the global user information system 212 and retrieve information associated with the map from the global user information system 212. The information may include objects located in locations portrayed by the map that may not be included in the map and locations of the objects. The objects may have been absent from the map included in the map database 204 due to map inadvertently generated without the objects, the generation of the map being prior to the introduction of the objects, the objects being temporarily introduced to the environment, or other similar reasons. The objects may have been previously sensed by the sensors 126 (FIG. 1) of the beacons 110 (FIG. 1), by sensors (such as the sensors 126 (FIG. 1)) of the wearable personal navigation device from which the request was received in stage 502, or by sensors (such as the sensors 126) of another wearable personal navigation device.

The interface system 102 may update the map with the objects. The interface system 102 may assign difficulty ratings to the multiple navigation paths based on the amount of objects along each of the multiple navigation paths. For example, a navigation path with many objects or certain types of objects along the path may be assigned a high difficulty rating, while another navigation path with few objects or different types of objects along the path may be assigned a low difficulty rating. The interface system 102 may save the difficulty ratings for the multiple navigation paths in the global user information system 212 and/or in the memory devices 106 (FIG. 1) of the interface system 102.

In stage 514, the interface system 514 may select a navigation path of the multiple alternative navigation paths. The navigation path may be selected based on the navigation being assigned a lowest difficulty rating of the multiple navigation paths. In some embodiments, the navigation path may be selected based on the difficulty rating of the navigation path being easier than a maximum difficulty rating and the navigation path being the shortest and/or quickest of the multiple navigation paths with difficulty ratings being easier than the maximum difficulty rating.

In stage 516, the interface system 102 may transmit the selected navigation path to the wearable personal navigation device. In some embodiments, the process 500 may terminate upon completion of stage 516. In other embodiments, the process 500 may proceed to stage 518.

In stage 518, the interface system 102 may receive feedback from the wearable personal navigation device regarding the navigation path. The feedback may include a user-assigned difficulty rating for the navigation path, indications of additional objects along the navigation path, or some combination thereof.

In stage 520, the interface system 102 may update the difficulty rating of the navigation path based on the feedback.

Figure 6:
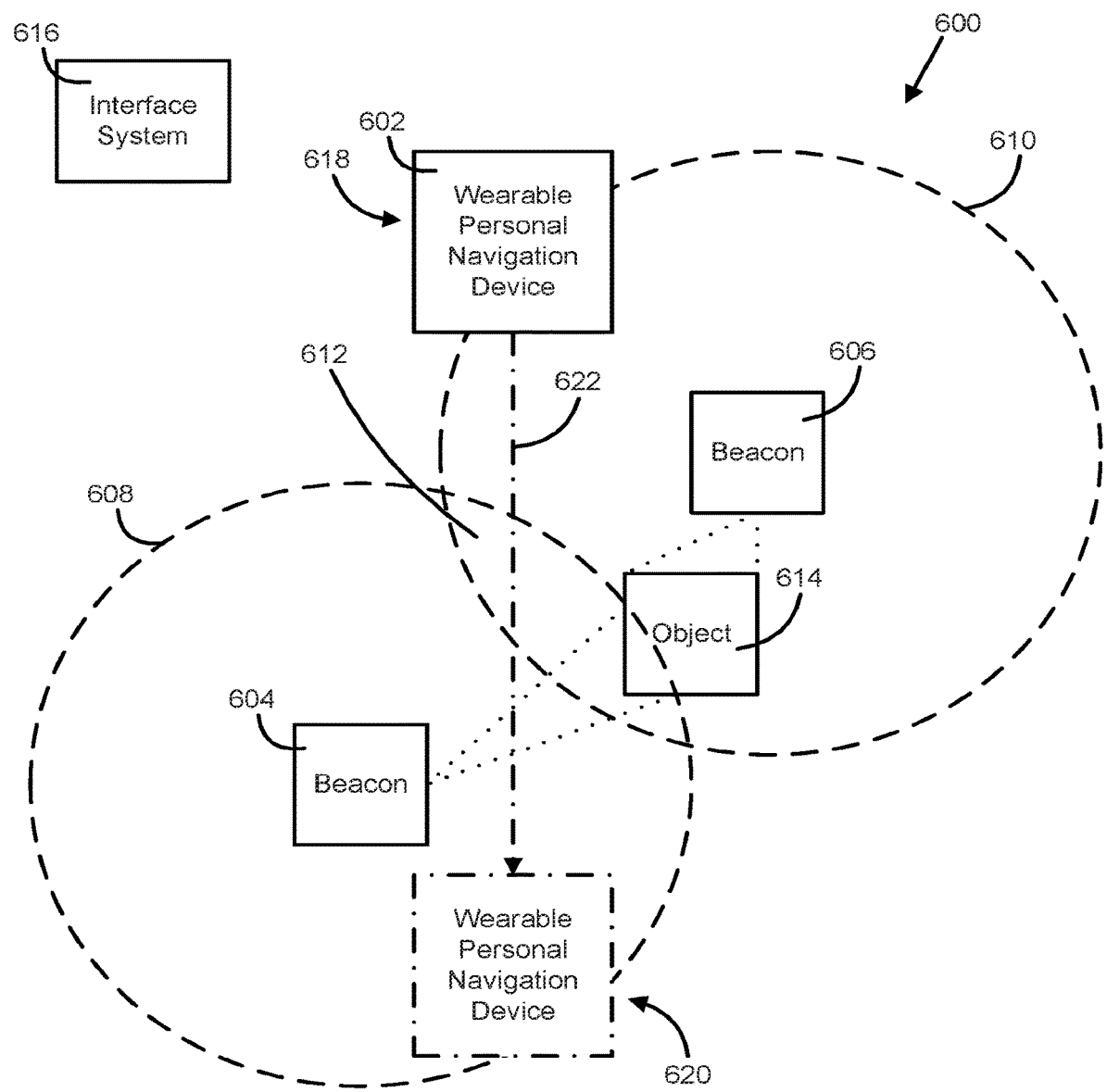
FIG. 6 illustrates an example representation of a wearable personal navigation device traveling through multiple beacon operating regions, according to various embodiments.

FIG. 6 illustrates an example representation 600 of a wearable personal navigation device 602 traveling through multiple beacon operating regions, according to various embodiments. The wearable personal navigation device 602 may be part of a travel assistance system. The wearable personal navigation device 602 may include one or more features of the wearable personal navigation devices 118 (FIG. 1). Further, the travel assistance system may include one or more of the features of the travel assistance system 100 (FIG. 1).

The representation 600 may include a first beacon 604 and a second beacon 606. The first beacon 604 and the second beacon 606 may include one or more of the features of the beacons 110. The first beacon 604 may have an operating region 608. Further, the second beacon 606 may have an operating region 610. In the illustrated embodiment, the operating region 608 of the first beacon 604 and the operating region 610 of the second beacon 606 may overlap and have an overlapping region 612.

The representation 600 may further include an object 614. The object 614 may be located at least partially in the overlapping region 612. The first beacon 604 may sense the presence of the object 614 via one or more sensors (such as the sensors 114 (FIG. 1)) of the first beacon 604 based on the object 614 being at least partially within the operating region 608 of the first beacon 604. The first beacon 604 may further determine a location of at least a portion of the object 614 within the operating region 608 of the first beacon 604. The first beacon 604 may transmit an indication of the presence of the object 614 and the location of the object 614 to a interface system 616. The interface system 616 may include one or more of the features of the interface system 102 (FIG. 1).

The second beacon 606 may also sense the present of the object 614 via one or more sensors (such as the sensors 114 (FIG. 1)) of the second beacon 606 based on the object 614 being at least partially within the operation region 610 of the second beacon 606. The second beacon 606 may further determine a location of at least a portion of the object 614 within the operating region 610 of the second beacon 606. The second beacon 606 may transmit an indication of the presence of the objection 614 and the location of the object 614 to the interface system 616.

The wearable personal navigation device 602 may start in a first location 618 located at least partially within the operating region 610 of the second beacon 606. When in the operating region 610, the wearable personal navigation device 602 may communicate with the second beacon 606. The second beacon 606 may operate as a relay, relaying communication between the wearable personal navigation device 602 and the interface system 616. In some embodiments, the wearable personal navigation device 602 may communicate directly with the interface system 616 (i.e. communication between the wearable personal navigation device 602 and the interface system 616 is not relayed via the second beacon 606). It is to be understood that description of communications between the interface system 616 and the wearable personal navigation device 602 throughout this disclosure may be communication directly between the interface system 616 and the wearable 602 or may be relayed by the second beacon 606 and/or the first beacon 604.

The wearable personal navigation device 602 may transmit a request for a navigation path from the first location 618 to a second location 620 to the interface system 616. The interface system 616 may return a navigation path 622 to the wearable personal navigation device 602. The navigation path 622 may avoid the object 614.

As the wearable personal navigation device 602 travels along the navigation path 622, the wearable personal navigation device 602 may enter the overlapping region 612. While in the overlapping region 612, the wearable personal navigation device 602 may communicate with the first beacon 604, the second beacon 606, or both the first beacon 604 and the second beacon 606. The first beacon 604 and/or the second beacon 606 may relay communication between the wearable personal navigation device 602 and the interface system 616. In some embodiments, the wearable personal navigation device 602 may communicate directly with the interface system 616.

As the wearable personal navigation device 602 continues to travel along the navigation path 622, the wearable personal navigation device 602 may exit the overlapping region 612 and may be located at least partially within the operating region 608 of the first beacon 604. When in the operating region 608, the wearable personal navigation device 602 may communicate with the first beacon 604. The second beacon 604 may operate as a relay, relaying communication between the wearable personal navigation device 602 and the interface system 616. In some embodiments, the wearable personal navigation device 602 may communicate directly with the interface system 616.

Figure 7:
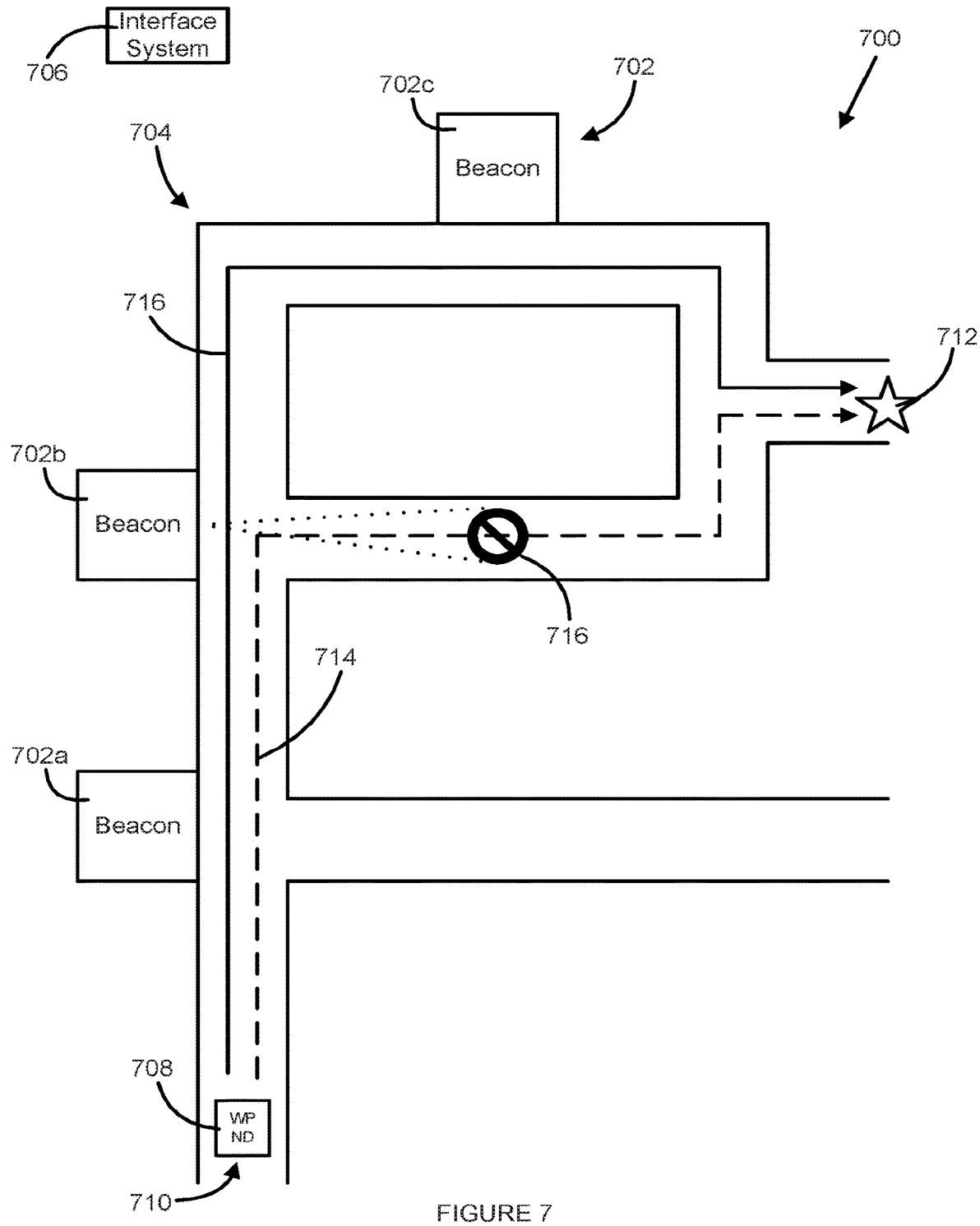
FIG. 7 illustrates an example layout that illustrates some features of a travel assistance system, according to various embodiments.

FIG. 7 illustrates an example layout 700 that illustrates some features of a travel assistance system, according to various embodiments. The travel assistance system may include one or more of the features of the travel assistance system 100 (FIG. 1).

In the illustrated embodiment, the travel assistance system may include one or more beacons 702. In particular, the travel assistance system may include a first beacon 702a, a second beacon 702b, and a third beacon 702c. The beacons 702 may include one or more of the features of the beacons 110 (FIG. 1). The beacons 702 may be located around a structure represented by a map 704 in the layout 700.

The map 704 may have been obtained by an interface system 706 in response to a request for a navigation path from wearable personal navigation device 708. The interface system 706 may include one or more of the features of the interface system 102 (FIG. 1). Further, the wearable personal navigation device 708 may include one or more of the features of the wearable personal navigation device 118 (FIG. 1). The interface system 706 may obtain the map 704 from a map database (such as the map database 204 (FIG. 2)). The map 704 may include a current position 710 of the wearable personal navigation device 708 and a destination 712. The map 704 may further include a first navigation path 714 from the current position 710 to the destination 712 that may have been indicated by the map database.

In the illustrated embodiment, the second beacon 702b may have sensed an object 716 and a location of the object 716 within the structure. The second beacon 702b may have sensed the object 716 by any means of sensing an object described in relation to the beacons 110. The second beacon 702b may have transmitted an indication of the presence of the object 716 and the location of the object 716 to the interface system 706.

In response to having received the indication of the presence of the object 716 and the location of the object 716, the interface system 706 may have analyzed the indication and determined that the object 716 impedes travel along the first navigation path 714. The interface system 706 may have generated a second navigation path 718 that avoids the object 716. In particular, the second navigation path 718 may include a modification from the first navigation path 714 that causes the second navigation path 718 to avoid the object 716. The interface system 706 may have transmitted to the second navigation path 718 to the wearable personal navigation device 708 to be used for guiding a user from the current position 710 to the destination 712 via indicating a direction of travel (such as the indication of the direction of travel described in relation to the wearable personal navigation device 118).

Figure 8:
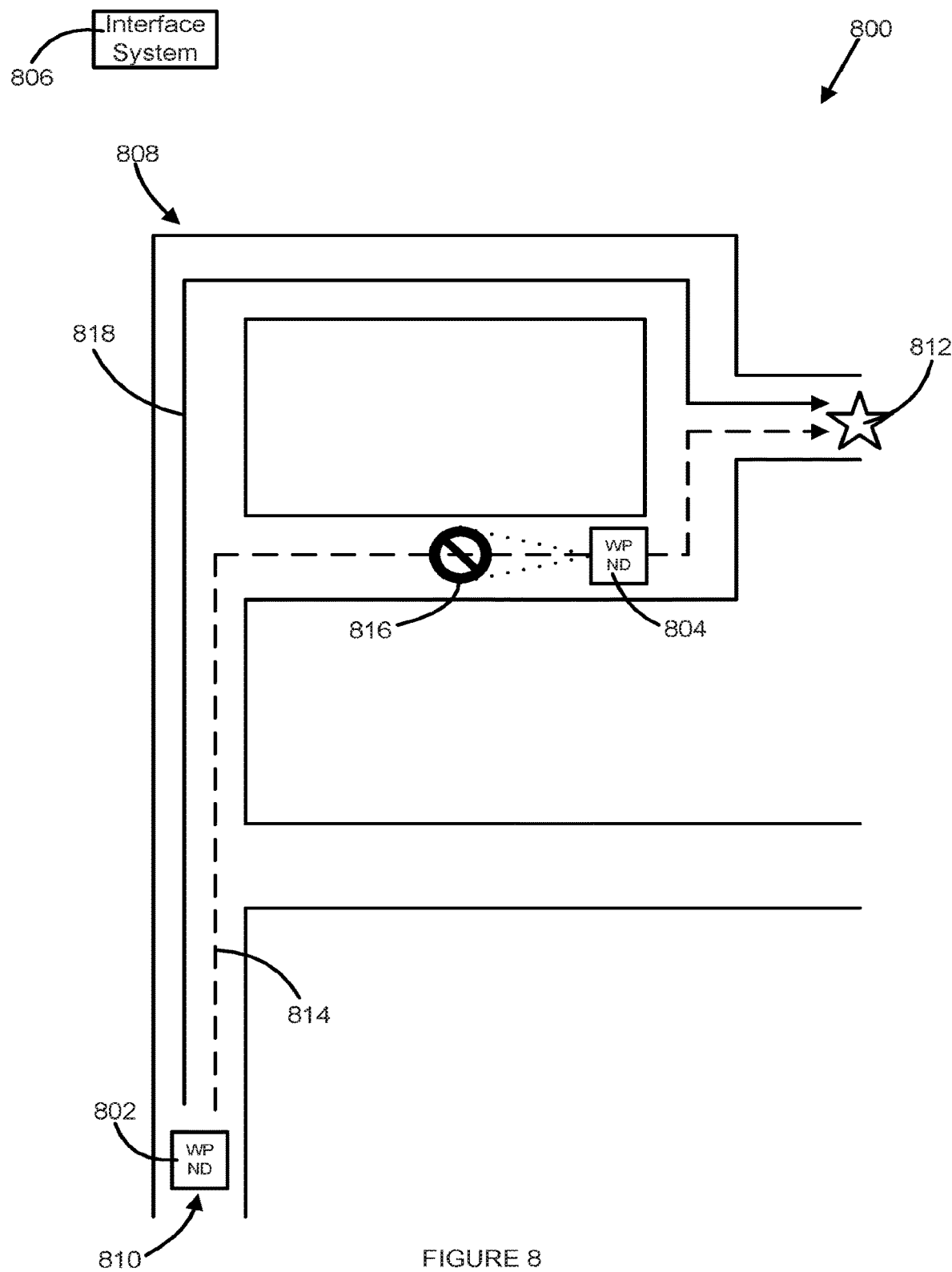
FIG. 8 illustrates another example layout that illustrates some features of a travel assistance system, according to various embodiments.

FIG. 8 illustrates another example layout 800 that illustrates some features of a travel assistance system, according to various embodiments. The travel assistance system may include one or more of the features of the travel assistance system 100 (FIG. 1).

In the illustrated embodiment, the travel assistance system may include a first wearable personal navigation device 802 and a second wearable personal navigation device 804. The first wearable personal navigation device 802 and the second wearable personal navigation device 804 may include one or more of the features of the wearable personal navigation devices 118 (FIG. 1).

An interface system 806 may have obtained a map 808, wherein the map 808 represents a structure. The interface system 806 may include one or more of the features of the interface system 102 (FIG. 1). The map 808 may have been retrieved by the interface system 806 in response to a request for a navigation path from first wearable personal navigation device 802. The interface system 806 may retrieve the map 808 from a map database (such as the map database 204 (FIG. 2)). The map 808 may include a current position 810 of the first wearable personal navigation device 802 and a destination 812. The map 808 may further include a first navigation path 814 from the current position 810 to the destination 812 that may have been indicated by the map database.

In the illustrated embodiment, the second wearable personal navigation device 804 may have sensed an object 816 and a location of the object 816 within the structure. The second wearable personal navigation device 804 may have sensed the object 816 by any means of sensing an object described in relation to the wearable personal navigation devices 118. The second wearable personal navigation device 804 may have transmitted an indication of the presence of the object 816 and the location of the object 816 to the interface system 806.

In response to having received the indication of the presence of the object 816 and the location of the object 816, the interface system 806 may have analyzed the indication and determined that the object 816 impedes travel along the first navigation path 814. The interface system 806 may have generated a second navigation path 818 that avoids the object 816. In particular, the second navigation path 816 may include a modification from the first navigation path 814 that causes the second navigation path 818 to avoid the object 816. The interface system 806 may have transmitted to the second navigation path 816 to the first wearable personal navigation device 802 to be used for guiding a user from the current position 810 to the destination 812 via indicating a direction of travel (such as the indication of the direction of travel described in relation to the wearable personal navigation device 118).

Figure 9:
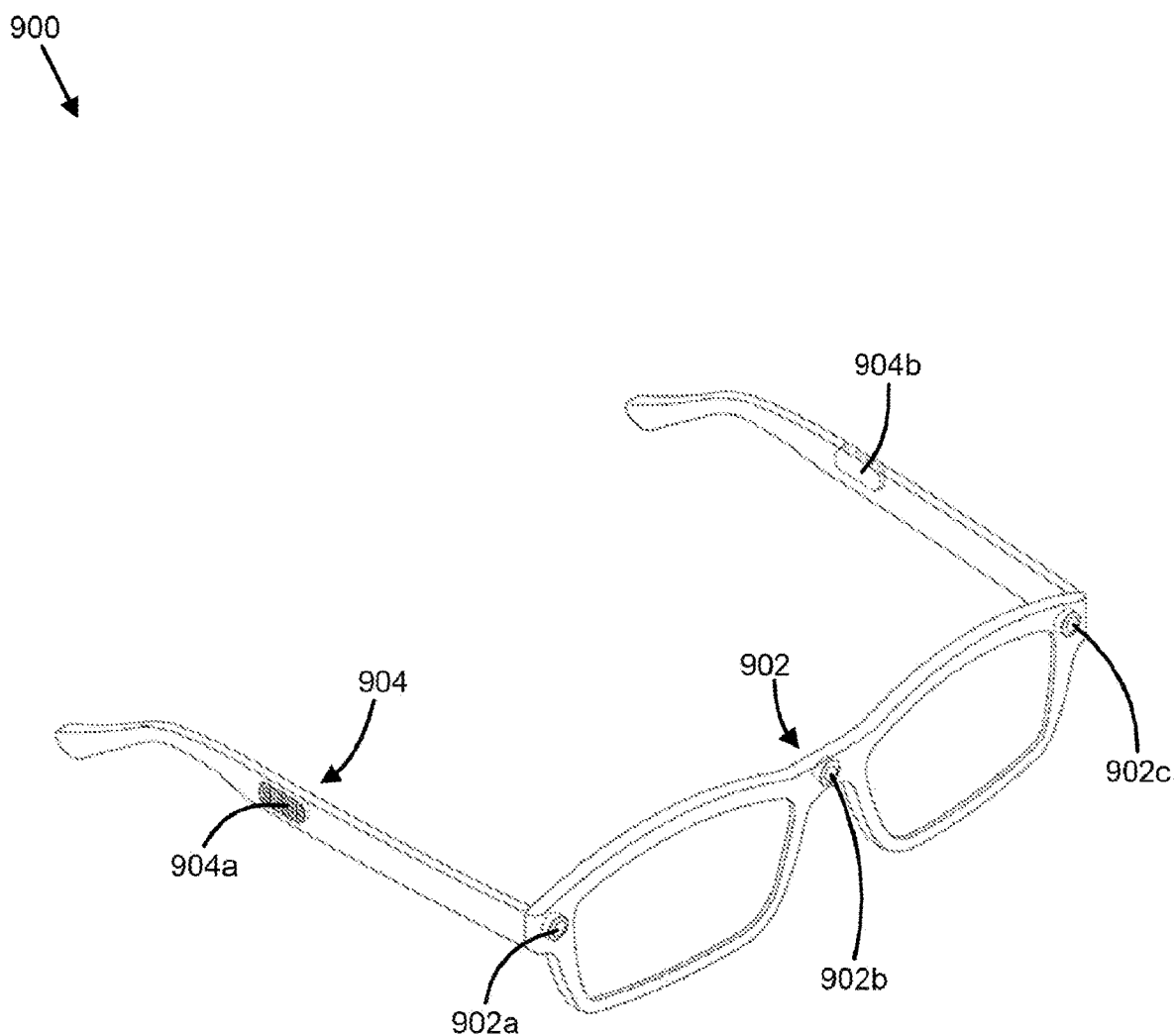
FIG. 9 illustrates an example pair of glasses adapted for use in connection with the travel assistance system of FIG. 1, according to various embodiments.

FIG. 9 illustrates an example pair of glasses 900 adapted for use in connection with a travel assistance system, according to various embodiments. The travel assistance system may include one or more of the features of the travel assistance system 100 (FIG. 1), the travel assistance system described in relation to FIG. 6, the travel assistance system described in relation to FIG. 7, the travel assistance system described in relation to FIG. 8, or some combination thereof. The pair of glasses 900 may be an embodiment of a wearable personal navigation device, such as the wearable personal navigation device 118 (FIG. 1).

The pair of glasses 900 may include may include one or more sensors 902. The sensors 902 may include one or more of the features of the sensors 126 (FIG. 1). In the illustrated embodiment, the sensors 902 may include a first camera 902a, a second camera 902b, and a third camera 902c. The first camera 902a, the second camera 902b, and the third camera 902c may be located within a frame of the pair of glasses 900 and may be directed outwards from the front and/or sides of the pair of glasses 900. The first camera 902a, the second camera 902b, and the third camera 902c may capture images of the environment surrounding the pair of glasses 900.

The pair of glasses 900 may further include a processor (not shown) embedded within the frame of the pair of glasses 900. The processor may include one or more of the features of the processor 122 (FIG. 1). Further, the pair of glasses 900 may include a communication system (not shown) embedded within the frame of the pair of glasses 900. The communication system may include one or more of the features of the communication system 120 (FIG. 1).

The processor may analyze the images captured by the first camera 902*a*, the second camera 902*b*, and the third camera 902*c* and may determine if there any objects within the environment surrounding the pair of glasses 900. In particular, the processor may analyze the images for objects that impede travel along a navigation path that pair of glasses 900 is guiding a user along. In response to detecting that at least one object that impedes travel, the processor may cause the communication system to transmit an indication of the presence of the object(s) and the location of the object(s) to an interface system (such as the interface system 102 (FIG. 1)) of the travel assistance system. In other embodiments, the processor may transmit one or more representations of the images to the interface system, via the communication system, for analysis by the interface system.

The pair of glasses 900 may further include one or more indicators 904. The indicators 904 may include one or more of the features of the indicators 128 (FIG. 1). In the illustrated embodiment, the indicators 904 may include a first speaker 904*a* and a second speaker 904*b*. The first speaker 904*a* and the second speaker 904*b* may indicate a direction of travel to the user of the pair of glasses 900. The first speaker 904*a* and the second speaker 904*b* may indicate the direction of travel via words describing the direction of travel, sounds that indicate the direction of travel, or some example thereof. For example, the first speaker 904*a* may emit a sound to indicate that the user should turn to the right to follow the direction of the travel and the second speaker 904*b* may emit a sound to indicate that the user should turn to the left to follow the direction of travel.

In some embodiments, the pair of glasses 900 may further include a battery (not shown) and/or a charger (not shown) coupled to the battery. The battery may power the sensors 902, the indicators 904, the processor, the communication system, or some combination thereof. The charger may include a motion activated kinetic energy charger, or other forms of energy chargers, that can charge the battery and/or directly power the pair of glasses 900. Further, in some embodiments, the pair of glasses 900 may include additional energy storage elements, that may provide for increased energy storage.

In some embodiments, vision assistive devices may be used in connection with the travel assistance system in place of the pair of glasses 900. The vision assistive devices may include one or more of the features of the pair of glasses 900.

Figure 10:
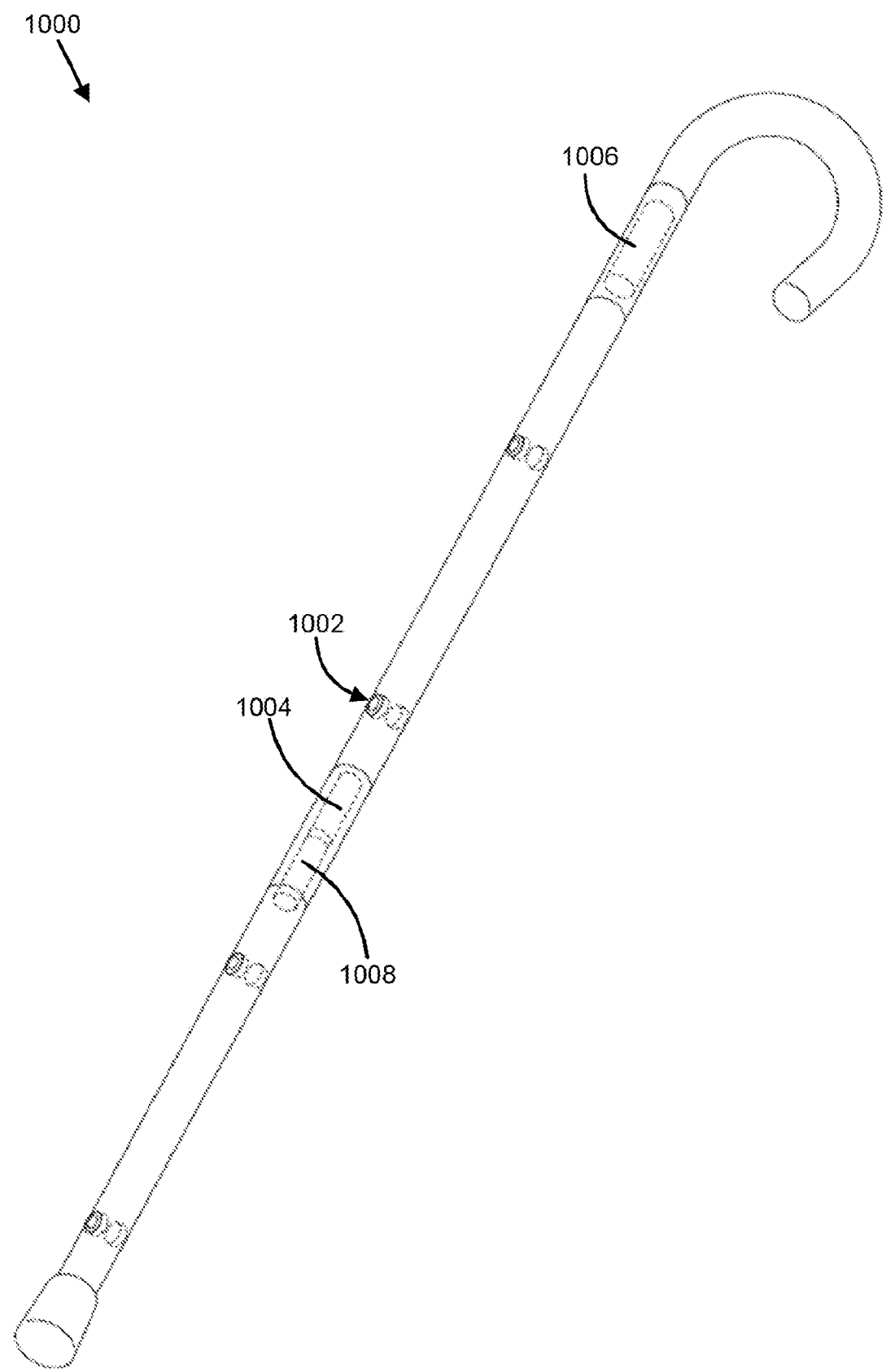
FIG. 10 illustrates an example cane adapted for use in connection with the travel assistance system of FIG. 1, according to various embodiments.

FIG. 10 illustrates an example cane 1000 adapted for use in connection with a travel assistance system, according to various embodiments. The travel assistance system may include one or more of the features of the travel assistance system 100 (FIG. 1), the travel assistance system described in relation to FIG. 6, the travel assistance system described in relation to FIG. 7, the travel assistance system described in relation to FIG. 8, or some combination thereof. The cane 1000 may be an embodiment of a wearable personal navigation device, such as the wearable personal navigation device 118 (FIG. 1).

The cane 1000 may include may include one or more sensors 1002. The sensors 1002 may include one or more of the features of the sensors 126 (FIG. 1). In the illustrated embodiment, the sensors 1002 may include one or more cameras. The cameras may be located along a length of the cane 1000 and may be directed outwards from the cane 1000. The cameras may capture images of the environment surrounding the cane 1000.

The cane 1000 may further include a processor and a communication system (illustrated as combined within the processor/communication system 1004) embedded within the cane 1000. The processor may include one or more of the features of the processor 122 (FIG. 1). Further, the communication system may include one or more of the features of the communication system 120 (FIG. 1).

The processor may analyze the images captured by cameras and may determine if there any objects within the environment surrounding the cane 1000. In particular, the processor may analyze the images for objects that impede travel along a navigation path that pair of glasses is guiding a user along. In response to detecting that at least one object that impedes travel, the processor may cause the communication system to transmit an indication of the presence of the object(s) and the location of the object(s) to an interface system (such as the interface system 102 (FIG. 1)) of the travel assistance system. In other embodiments, the processor may transmit one or more representations of the images to the interface system, via the communication system, for analysis by the interface system.

The cane 1000 may further include one or more indicators 1006. The indicators 1006 may include one or more of the features of the indicators 128 (FIG. 1). In the illustrated embodiment, the indicators 1006 may include one or more actuators. The actuators may indicate a direction of travel to the user of the cane 1000. In particular, the actuators may be located in a handle of the cane 1000 and may apply a force to a hand of the user to indicate the direction of travel.

In some embodiments, the cane 1000 may further include a battery and/or a charger (illustrated as combined within the battery/charger 1008) coupled to the battery. The battery may power the sensors 1002, the indicators 1006, the processor, the communication system, or some combination thereof. The charger may include a kinetic energy charger that charges the battery as the cane 1000 moves.

Figure 11:
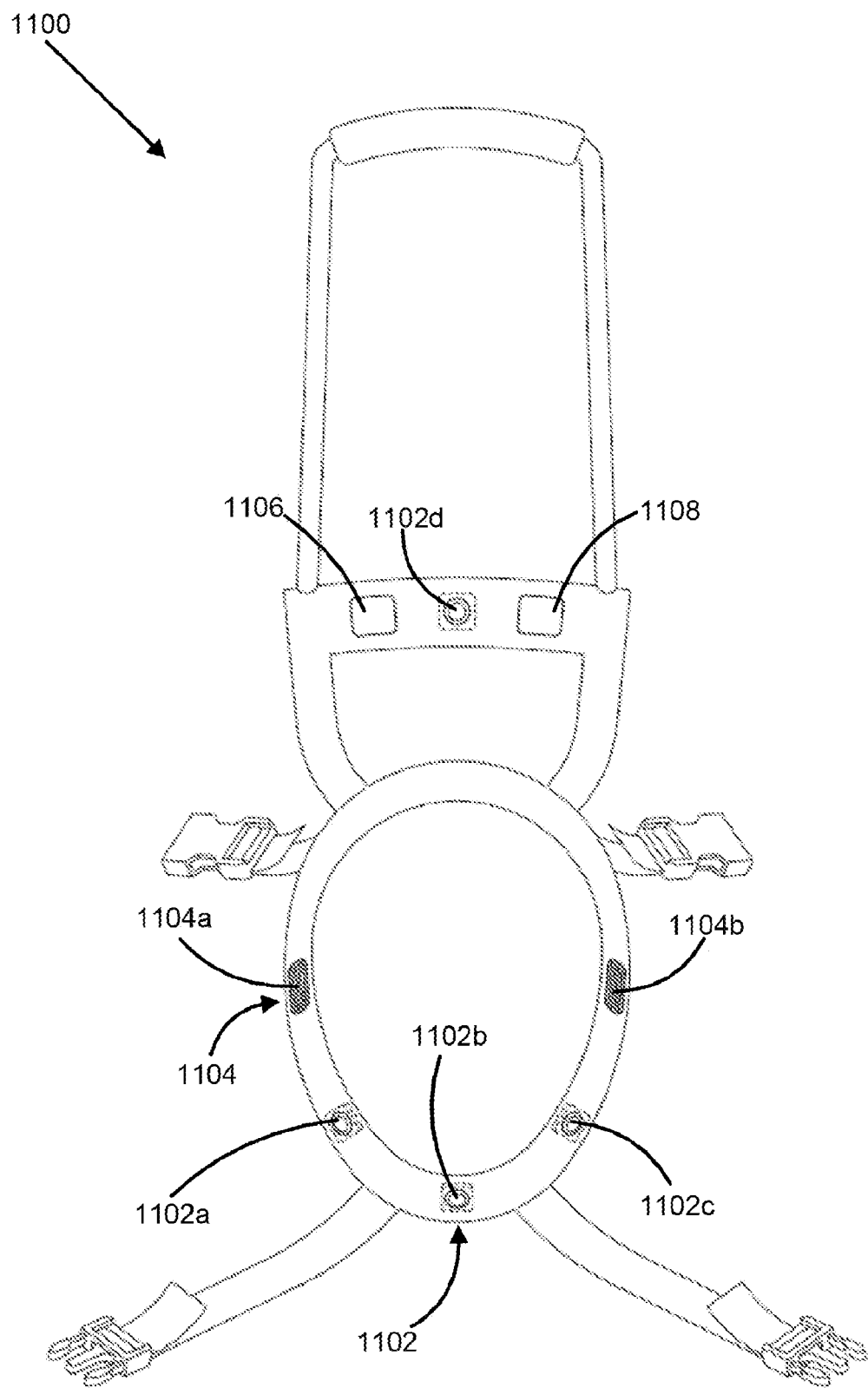
FIG. 11 illustrates an example animal harness adapted for use in connection with the travel assistance system of FIG. 1, according to various embodiments.

FIG. 11 illustrates an example animal harness 1100 adapted for use in connection with a travel assistance system, according to various embodiments. The travel assistance system may include one or more of the features of the travel assistance system 100 (FIG. 1), the travel assistance system described in relation to FIG. 6, the travel assistance system described in relation to FIG. 7, the travel assistance system described in relation to FIG. 8, or some combination thereof. The animal harness 1100 may be an embodiment of a wearable personal navigation device, such as the wearable personal navigation device 118 (FIG. 1). The animal harness 1100 may be placed on an animal associated with the user, such as on a service dog.

The animal harness 1100 may include may include one or more sensors 1102. The sensors 1102 may include one or more of the features of the sensors 126 (FIG. 1). In the illustrated embodiment, the sensors 1102 may include a first camera 1102*a*, a second camera 1102*b*, a third camera 1102*c*, and a forth camera 1102*d*. The first camera 1102*a*, the second camera 1102*b*, the third camera 1102*c*, and the forth camera 1102*d* may be located along the animal harness 1100 and may be directed outwards from the animal harness 1100. The first camera 1102*a*, the second camera 1102*b*, the third camera 1102*c*, and the forth camera 1102*d* may capture images of the environment surrounding the cane 1000.

The animal harness 1100 may further include a processor and a communication system (illustrated as combined within the processor/communication system 1108) embedded within the animal harness 1100. The processor may include one or more of the features of the processor 122 (FIG. 1). Further, the communication system may include one or more of the features of the communication system 120 (FIG. 1).

The processor may analyze the images captured by the first camera 1102*a*, the second camera 1102*b*, the third camera 1102*c*, and the forth camera 1102*d* and may determine if there any objects within the environment surrounding the animal harness 1100. In particular, the processor may analyze the images for objects that impede travel along a navigation path that pair of glasses is guiding a user along. In response to detecting that at least one object that impedes travel, the processor may cause the communication system to transmit an indication of the presence of the object(s) and the location of the object(s) to an interface system (such as the interface system 102 (FIG. 1)) of the travel assistance system. In other embodiments, the processor may transmit one or more representations of the images to the interface system, via the communication system, for analysis by the interface system.

The animal harness 1100 may further include one or more indicators 1104. The indicators 1104 may include one or more of the features of the indicators 128 (FIG. 1). The indicators 1104 may include one or more speakers. In the illustrated embodiment, the indicators 1104 may include a first speaker 1104*a* and a second speaker 1104*b*. The first speaker 1104*a* and the second speaker 1104*b* may indicate a direction of travel to the user of the animal harness 1100. The first speaker 1104*a* and the second speaker 1104*b* may indicate the direction of travel via words describing the direction of travel, sounds that indicate the direction of travel, or some example thereof. For example, the first speaker 1104*a* may emit a sound to indicate that the animal wearing the animal harness 1100 should turn to the right to lead an individual along the direction of the travel and the second speaker 1104*b* may emit a sound to indicate that the animal wearing the animal harness 1100 should turn to the left to lead the individual along the direction of the travel.

In some embodiments, the indicators 1104 may include actuators, such as the actuators described in relation to the indicators 128. The actuators may apply a force to the animal wearing the animal harness 1100, where the force may indicate a direction of travel to the animal. In some embodiments, the indicators 1104 may use touch commands to indicate direction the animal should travel.

In some embodiments, the animal harness 1100 may further include a battery and/or a charger (illustrated as combined within the battery/charger 1006) coupled to the battery. The battery may power the sensors 1102, the indicators 1104, the processor, the communication system, or some combination thereof. The charger may include a kinetic energy charger that charges the battery as the animal harness 1100 moves. In some embodiments, the charger may include a solar charger that charges the battery as light contacts the solar charger.

Figure 12:
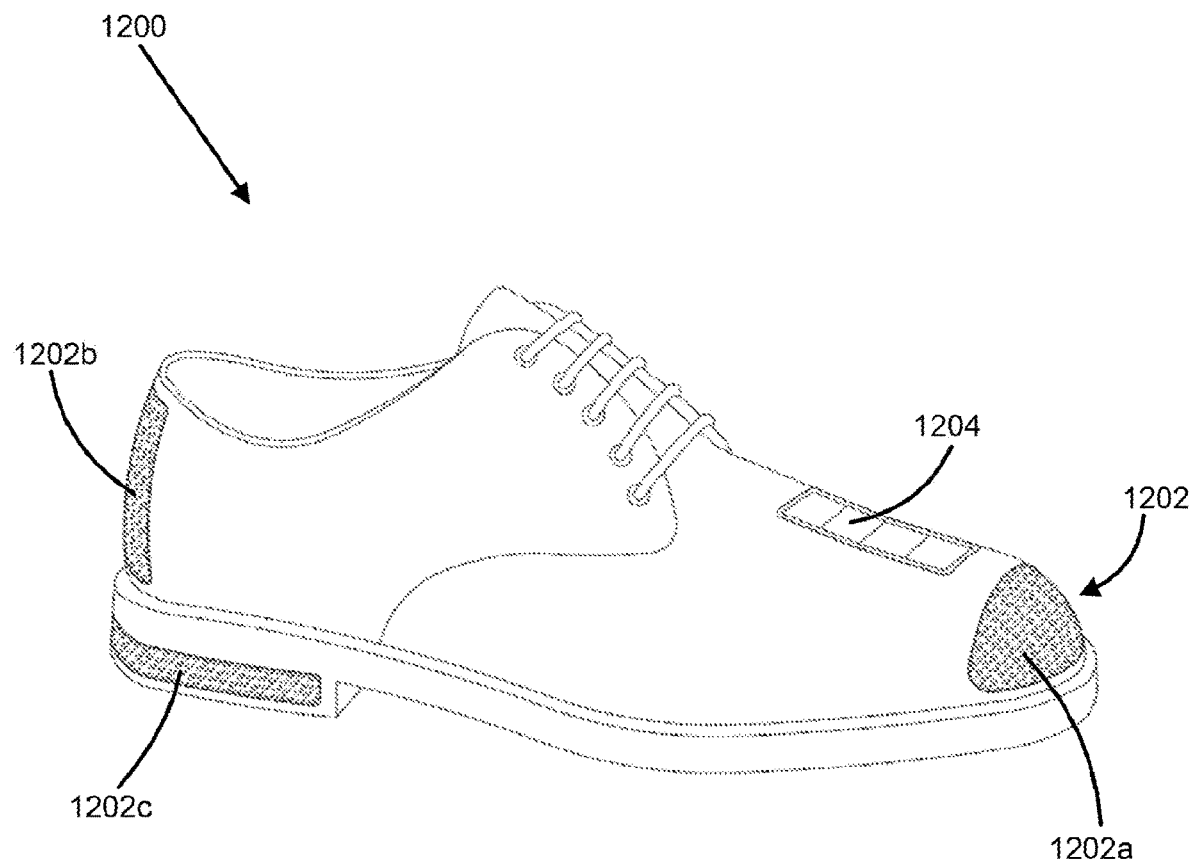
FIG. 12 illustrates an example shoe adapted for use in connection with the travel assistance system of FIG. 1, according to various embodiments.

FIG. 12 illustrates an example shoe 1200 adapted for use in connection with a travel assistance system, according to various embodiments. The travel assistance system may include one or more of the features of the travel assistance system 100 (FIG. 1), the travel assistance system described in relation to FIG. 6, the travel assistance system described in relation to FIG. 7, the travel assistance system described in relation to FIG. 8, or some combination thereof. The shoe 1200 may be an embodiment of a wearable personal navigation device, such as the wearable personal navigation device 118 (FIG. 1). The shoe 1200 may be worn by a user.

The shoe 1200 may include may include one or more sensors 1202. The sensors 1202 may include one or more of the features of the sensors 126 (FIG. 1). In the illustrated embodiment, the sensors 1202 may include a first pressure sensor 1202*a*, a second pressure sensor 1202*b*, and a third pressure sensor 1202*c*. The first pressure sensor 1202*a*, the second pressure sensor 1202*b*, and the third pressure sensor 1202*c* may be located may be located throughout the shoe 1200 and may sense contact of objects with the exterior of the shoe 1200. In particular, the first pressure sensor 1202*a*, the second pressure sensor 1202*b*, and the third pressure sensor 1202*c* may sense contact with an object and a location of the object can be determined based on the location of the shoe 1200.

The shoe 1200 may further include a processor (not shown) and a communication system (not shown) embedded within the shoe 1200. The processor may include one or more of the features of the processor 122 (FIG. 1). Further, the communication system may include one or more of the features of the communication system 120 (FIG. 1). In response to an object being sensed by the sensors 1202, the processor may cause the communication system to transmit an indication of the presence of the object(s) and the location of the shoe 1200 and/or object(s) to an interface system (such as the interface system 102 (FIG. 1)) of the travel assistance system. The interface system may determine the location of the object based on the indication from the shoe 1200.

The shoe 1200 may further include one or more indicators (not shown). The indicators may include one or more of the features of the indicators 128 (FIG. 1). The indicators may be located within an interior of the shoe and may abut a foot of the user. In the illustrated embodiment, the indicators may include one or more actuators. The actuators may indicate a direction of travel to the user of the shoe. In particular, the actuators may be located at different locations within the interior of the shoe and may apply a force to the foot of the user to indicate the direction of travel.

In some embodiments, the shoe 1200 may further include a battery (not shown) and/or a charger 1204 coupled to the battery. The battery may power the sensors 1202, the indicators, the processor, the communication system, or some combination thereof. The charger 1204 may include a solar charger that may charge the battery as light contacts the solar charger. In some embodiments, the charger may include a kinetic energy charger that charges the battery as the shoe 1200 moves.

Figure 13:
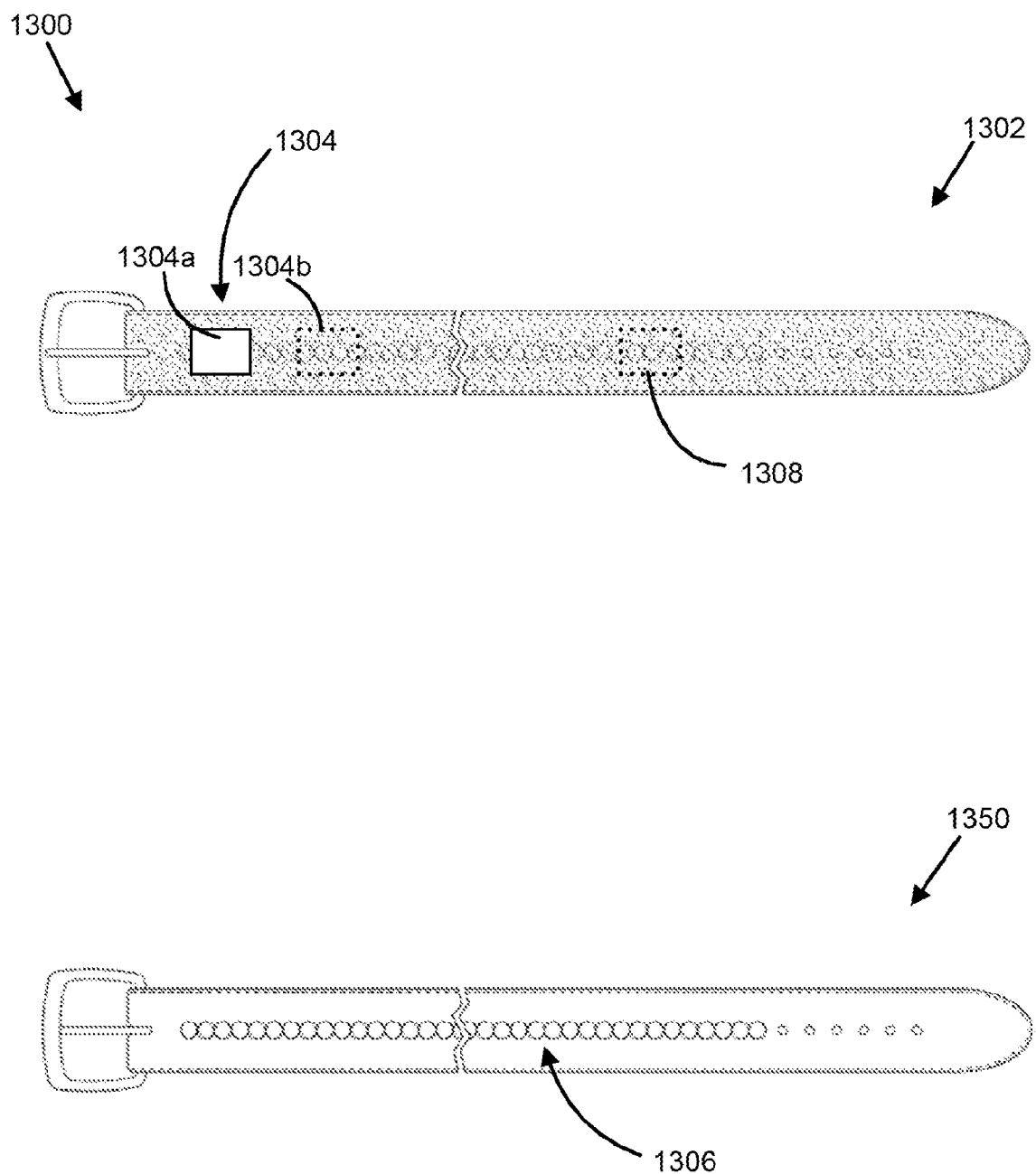
FIG. 13 illustrates an example belt adapted for use in connection with the travel assistance system of FIG. 1, according to various embodiments.

FIG. 13 illustrates an example belt 1300 adapted for use in connection with a travel assistance system, according to various embodiments. The belt 1300 may include an exterior side 1302 and an interior side 1350, wherein the interior side 1350 is to abut the user when the belt is worn. The exterior side 1302 of the belt 1300 may be textured to indicate that it is the exterior. The travel assistance system may include one or more of the features of the travel assistance system 100 (FIG. 1), the travel assistance system described in relation to FIG. 6, the travel assistance system described in relation to FIG. 7, the travel assistance system described in relation to FIG. 8, or some combination thereof. The belt 1300 may be an embodiment of a wearable personal navigation device, such as the wearable personal navigation device 118 (FIG. 1). The belt 1300 may be worn by a user.

The belt 1300 may include may include one or more sensors 1304. The sensors 1304 may include one or more of the features of the sensors 126 (FIG. 1). In the illustrated embodiment, the sensors 1304 may include an ambient light sensor 1304*a* and a motion sensor 1304*b*. The ambient light sensor 1304*a* may be located along the exterior side 1302 of the belt 1300 and may be directed outwards from the belt 1300. The ambient light sensor 1304*a* may sense an amount of ambient light surrounding the belt 1300. In some embodiments, one or more operations of the belt 1300 may be inactive until the amount of ambient light surrounding the belt 1300 is below a predetermined amount of ambient light, wherein additional operations of the belt 1300 may be active when the ambient light is below the predetermined amount of ambient light.

The motion sensor 1304*b* may be embedded within the belt 1300. The motion sensor 1304*b* may sense movement of the belt 1300. In some embodiments, one or more operations of the belt 1300 may be inactive when the motion sensor 1304*b* senses that the belt 1300 is not moving, wherein additional operations of the belt 1300 may be active when motion sensor 1304*b* senses that the belt 1300 is moving.

The belt 1300 may further include a processor (not shown) and a communication system (not shown) embedded within the belt 1300. The processor may include one or more of the features of the processor 122 (FIG. 1). Further, the communication system may include one or more of the features of the communication system 120 (FIG. 1).

The processor may analyze the amount of ambient light sensed by the ambient light sensor 1304*a* and may activate the additional operations of the belt 1300 when the ambient light is below the predetermined amount of ambient light. Further, the processor may analyze the motion of the belt 1300 sensed by the motion sensor 1304*b* and may activate the additional operations of the belt 1300 when the belt 1300 is in motion. The processor may further transmit an indication that the additional operations of the belt 1300 have been activated to an interface system (such as the interface system 102 (FIG. 1)) via the communication system. The interface system may perform operations to support the additional operations of the belt 1300 (such as providing a navigation path to the belt 1300) in response to receiving the indication.

The belt 1300 may further include one or more indicators 1306. The indicators 1306 may include one or more of the features of the indicators 128 (FIG. 1). In the illustrated embodiment, the indicators 1306 may include a line of actuators that extend along at least a portion of a length of the belt 130 and are either along the interior side 1350 of the belt 1300 or embedded within the belt 1300. The actuators may apply a force to the user to indicate a direction of travel to the user of the belt 1300.

The belt 1300 may further include a battery and/or a charger (illustrated as combined within the battery/charger 1308) coupled to the battery. The battery may power the sensors 1304, the indicators 1306, the processor, the communication system, or some combination thereof. The charger may include a solar charger that charges the battery as light contacts the solar charger. In some embodiments, the charger may include a kinetic energy charger that charges the battery as the belt 1300 moves.

Example 1 may include a wearable personal navigation device, comprising a communication system configured to wirelessly communicate with a node of a network, an indicator configured to indicate a direction of travel to a user of the wearable personal navigation device, and a processor coupled to the communication system and the indicator, wherein the processor is configured to generate a request for a navigation path from a location of the user to a destination, transmit the request to the node of the network via the communication system, determine the direction of travel from the location of the user based on a first navigation path received from the node of the network in response to the request, wherein the first navigation path includes at least one modification from a second navigation path that is generated based on a map accessible by the network, wherein the at least one modification is based on data received by the network from a remote device that indicates an object along the second navigation path, the object being absent from the map, and cause the indicator to indicate the direction of travel in response to the determination of the direction of travel.

Example 2 may include the wearable personal navigation device of example 1 or some other example herein, wherein the indicator includes a speaker, and wherein the speaker is configured to emit a sound that indicates the direction of travel.

Example 3 may include the wearable personal navigation device of example 2 or some other example herein, wherein the wearable personal navigation device is an article of clothing, a pair of glasses, a pair of head phones, a cane, a wristband, or an animal harness.

Example 4 may include the wearable personal navigation device of example 1 or some other example herein, wherein the indicator includes an actuator, wherein the actuator is to apply a force to the user or generate a touch pattern to be sensed by the user that indicates the direction of travel.

Example 5 may include the wearable personal navigation device of example 4 or some other example herein, wherein the wearable personal navigation device is a pair of glasses, a cane, an animal harness, a shoe, a belt, a wristband, or a glove.

Example 6 may include the wearable personal navigation device of example 1 or some other example herein, further comprising a camera configured to capture an image of a surrounding environment of the location of the user, wherein the processor is further configured to transmit a representation of the image to the node of the network via the communication system for identification of one or more additional objects by the network.

Example 7 may include the wearable personal navigation device of example 1 or some other example herein, further comprising a sonar system configured to detect a distance between a second object along the navigation path and the wearable personal navigation device, wherein the processor is further configured to transmit an indication of the distance to the node of the network via the communication system.

Example 8 may include the wearable personal navigation device of example 1 or some other example herein, further comprising an ambient light sensor configured to sense an amount of ambient light surrounding the wearable personal navigation device, wherein the processor is configured to generate the request in response to the amount of ambient light being below a threshold level.

Example 9 may include an interface system, comprising a communication system configured to wirelessly communicate with a wearable personal navigation device, and a processor coupled to the communication system, wherein the processor is configured to identify a destination within a request for a navigation path to the destination received from the wearable personal navigation device via the communication system, identify a location of the wearable personal navigation device in response to receipt of the request, obtain a first navigation path from the location of the wearable personal navigation device to the destination, the first navigation path obtained from a network resource via the communication system, modify the first navigation path based on an object along the navigation path identified from data received from a remote device via the communication system, wherein the modification of the first navigation path produces a second navigation path, and transmit the second navigation path to the wearable personal navigation device.

Example 10 may include the interface system of example 9 or some other example herein, wherein the remote device is a second wearable personal navigation device, and wherein the data received from the remote device includes a representation of an image captured by a camera of the second wearable personal navigation device.

Example 11 may include the interface system of example 9 or some other example herein, wherein the data received from the remote device includes a representation of an image captured by the remote device, and wherein the processor is further configured to identify the object from the representation of the image.

Example 12 may include the interface system of example 9 or some other example herein, wherein the processor is further configured to generate multiple alternative navigation paths based on data received from a plurality of remote devices, assign difficulty ratings to each of the multiple alternative navigation paths based on travel difficulty of each of the multiple alternative navigation paths, and select the second navigation path from the multiple alternative navigation paths based on the second navigation being assigned an easiest difficulty rating of the difficulty ratings assigned to each of the multiple alternative navigation paths.

Example 13 may include the interface system of example 12 or some other example herein, wherein the processor is further configured to update a difficulty rating of the second navigation path based on feedback received from the wearable personal navigation device via the communication system.

Example 14 may include the interface system of example 9 or some other example herein, further comprising a memory device, wherein the processor is further configured to store the second navigation path to the memory device, obtain the second navigation path from the memory device in response to a subsequent request from the location to the destination, and transmit the second navigation path via the communication system in response to the subsequent request.

Example 15 may include the interface system of example 9 or some other example herein wherein the remote device is a pair of glasses, ear phones, a cane, an animal harness, a shoe, a belt, a wristband, a glove, or an article of clothing that is to indicate a direction of travel to a user of the wearable personal navigation device based on the second navigation path.

Example 16 may include the interface system of example 9 or some other example herein, wherein the destination includes an indication of a resource, and wherein the processor is further configured to determine a location of the resource from a network-accessible database, wherein the location of the resource is utilized to obtain the first navigation path.

Example 17 may include the interface system of example 9 or some other example herein, wherein the processor is further configured to receive a request to identify a specified object within an environment around the wearable personal navigation device, the request initiated in response to a user request for identification of the specified object or a sudden deviation of the wearable personal navigation device from the second navigation path, identify the specified object, and transmit an indication of an identification of the specified object to the wearable personal navigation device.

Example 18 may include one or more computer readable media having instructions stored thereon, wherein the instructions, when executed by a wireless device, cause the wireless device to generate a request for a navigation path from a location of the wireless device to a destination, transmit the request to a node of a network, determine a direction of travel from the location of the wireless device based on a first navigation path received from the node of the network in response to the request, wherein the first navigation path includes at least one modification from a second navigation path that is generated based on a map accessible by the network, wherein the at least one modification is based on data received by the network from a remote device that indicates an object along the virtual navigation path, the object being absent from the map, and transmit an indication of the direction of travel to an indicator coupled to the wireless device, wherein the indicator is to indicate the direction of travel to a user of the wireless device.

Example 19 may include the one or more computer readable media of example 18 or some other example herein, wherein the indicator includes a pair of glasses with a speaker or a pair of ear phones, wherein the pair of glasses with the speaker or the pair of ear phones are to emit a sound that indicates the direction of travel in response to receiving the indication of the direction of travel.

Example 20 may include the one or more computer readable media of example 18 or some other example herein, wherein the instructions, when executed by the wireless device, further cause the wireless device to transmit a representation of an image to the node of the network, the representation of the image received from a camera of the indicator, determine an updated direction of travel based on an updated navigation path received from the node of the network, wherein the updated navigation path is updated from the navigation path based on representation of the image, and transmit an indication of the updated direction of travel to an indicator coupled to the wireless device, wherein the indicator is to indicate the updated direction of travel to a user of the wireless device.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A wearable personal navigation device communicatively coupled to one or more nodes of a network, the network concurrently communicatively coupled to a second wearable personal navigation device, the wearable personal navigation device comprising:
   a communication system configured to wirelessly communicate with the one or more nodes of the network;
   a sensor integrated within the wearable personal navigation device, the sensor configured to detect objects located proximate to the wearable personal navigation device; and
   a processor coupled to the communication system and the indicator, wherein the processor is configured to:
      receive a first navigation path from a location of the wearable personal navigation device to a destination, the first navigation path based on a map accessible by the network;
      determine a direction of travel along the first navigation path;
      transmit an indication of an object detected by the sensor, the object along the first navigation path and absent from the map, the transmission from the wearable personal navigation device, via the communication system, to a node of the one or more nodes of the network; and update from the first navigation path to a second navigation path based on information received from the node subsequent to detection of the object, wherein the detection of the object is further utilized by a second node of the one or more nodes of the network to provide an update to the second wearable personal navigation device.

2. The wearable personal navigation device of claim 1, further comprising an indicator configured to indicate a direction of travel to a user of the wearable personal navigation device, the indicator including a speaker configured to emit a sound indicating the direction of travel.

3. The wearable personal navigation device of claim 2, wherein the wearable personal navigation device is an article of clothing, a pair of glasses, a pair of headphones, a cane, a wristband, or an animal harness.

4. The wearable personal navigation device of claim 2, wherein the indicator includes an actuator, wherein the actuator is to apply a force to the user or generate a touch pattern to be sensed by the user that indicates the direction of travel.

5. The wearable personal navigation device of claim 4, wherein the wearable personal navigation device is a pair of glasses, a cane, an animal harness, a shoe, a belt, a wristband, or a glove.

6. The wearable personal navigation device of claim 1, further comprising a camera configured to capture an image of a surrounding environment of the location of the wearable personal navigation device, wherein the processor is further configured to transmit a representation of the image to the node via the communication system for identification of one or more additional objects.

7. The wearable personal navigation device of claim 1, further comprising a sonar system configured to detect a distance between a second object along the first navigation path and the wearable personal navigation device, wherein the processor is further configured to transmit an indication of the distance to the node via the communication system.

8. The wearable personal navigation device of claim 1, further comprising an ambient light sensor configured to sense an amount of ambient light surrounding the wearable personal navigation device, wherein the processor is configured to generate a request for the first navigation path in response to the amount of ambient light being below a threshold level.

9. A interface system, comprising:
a communication system configured to wirelessly communicate with a first wearable personal navigation device worn by a first user at a first location and a second wearable personal navigation device worn by a second user at a second location, the second user different from the first user, the second location different from the first location; and
a processor coupled to the communication system, wherein the processor is configured to:
identify a destination within a request for a first navigation path to the destination received from the first wearable personal navigation device via the communication system;
obtain the first navigation path from the location of the first wearable personal navigation device to the destination, the first navigation path obtained from a network resource via the communication system;
receive data from the second wearable personal navigation device via the communication system; and
modify the first navigation path to a second navigation path, the modification based on an object along the first navigation path identified from the data received from the second wearable personal navigation device.

10. The interface system of claim 9, wherein the data includes a representation of an image captured by a camera of the second wearable personal navigation device.

11. The interface system of claim 9, wherein:
the data includes a representation of an image captured by the second wearable personal navigation device, and
the processor is further configured to:
identify the object from the representation of the image.

12. The interface system of claim 9, wherein the processor is further configured to:
generate multiple alternative navigation paths based on data received from a plurality of remote devices;
assign difficulty ratings to each of the multiple alternative navigation paths based on a travel difficulty of each of the multiple alternative navigation paths; and
select the second navigation path from the multiple alternative navigation paths based on the second navigation being assigned an easiest difficulty rating of the difficulty ratings assigned to each of the multiple alternative navigation paths.

13. The interface system of claim 12, wherein the processor is further configured to:
update a difficulty rating of the second navigation path based on feedback received from the wearable personal navigation device via the communication system.

14. The interface system of claim 9, further comprising a memory device, wherein the processor is further configured to:
store the second navigation path to the memory device;
obtain the second navigation path from the memory device in response to a subsequent request from the location to the destination; and
transmit the second navigation path via the communication system in response to the subsequent request.

15. The interface system of claim 9, wherein the second wearable personal navigation device is a pair of glasses, a pair of earphones, a cane, an animal harness, a shoe, a belt, a wristband, a glove, or an article of clothing that is to indicate a direction of travel to a user of the second wearable personal navigation device.

16. The interface system of claim 9, wherein the destination includes an indication of a resource, and wherein the processor is further configured to:
determine a location of the resource from a network-accessible database, wherein the location of the resource is utilized to obtain the first navigation path.

17. The interface system of claim 9, wherein the processor is further configured to:
receive a request to identify a specified object within an environment around the first wearable personal navigation device, the request initiated in response to a user request for identification of the specified object or a sudden deviation of the first wearable personal navigation device from the first navigation path;
identify the specified object; and
transmit an indication of an identification of the specified object to the first wearable personal navigation device.

18. One or more computer readable media having instructions stored thereon, wherein the instructions, when executed by a processor of a first wearable personal navigation device, cause the processor of the first wearable personal navigation device to:

generate a request for a first navigation path from a location of the first wearable personal navigation device to a destination;

transmit the request to a node of a network;

receive a response to the request, the response including the first navigation path based on a map accessible by the node of the network;

determine a direction of travel from the location of the first wearable personal navigation device based on the first navigation path;

receive a second navigation path including at least one modification to the first navigation path, wherein the at least one modification is based on data received from a second wearable personal navigation device that indicates an object along the first navigation path, the object being absent from the map; and transmit an indication of the direction of travel to an indicator coupled to the first wearable personal navigation device, wherein the indicator is to indicate the direction of travel to a user of the first wearable personal navigation device relative to the second navigation path.

19. The one or more computer readable media of claim 18, wherein the indicator includes a pair of glasses with a speaker or a pair of earphones, wherein the pair of glasses with the speaker or the pair of ear phones are to emit a sound that indicates the direction of travel in response to receiving the indication of the direction of travel from the wireless device.

20. The one or more computer readable media of claim 18, wherein the instructions, when executed by the processor of the first wearable personal navigation device, further cause the wireless device to:

transmit a representation of an image to the node of the network, the representation of the image received from a camera of the first wearable personal navigation device;

determine an updated direction of travel based on an updated navigation path received from the node of the network, wherein the updated navigation path is updated from the navigation path based on the representation of the image; and transmit an indication of the updated direction of travel to the indicator coupled to the first wearable personal navigation wireless device, wherein the indicator is to indicate the updated direction of travel to the user of the first wearable personal navigation device.

* * * * *